(12) United States Patent
Walton et al.

(10) Patent No.: US 6,593,987 B1
(45) Date of Patent: Jul. 15, 2003

(54) MULTI-DOMAIN SURFACE MODE DEVICE

(75) Inventors: Harry Garth Walton, Cowley (GB); Michael John Towler, Botley (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/321,018

(22) Filed: May 27, 1999

(30) Foreign Application Priority Data

May 30, 1998 (GB) ................................. 9811579

(51) Int. Cl.$^7$ ...................... G02F 1/1337; G02F 1/1343
(52) U.S. Cl. ........................................ 349/129; 349/144
(58) Field of Search ............................... 349/124, 117, 349/129, 144

(56) References Cited

U.S. PATENT DOCUMENTS

| | | | | |
|---|---|---|---|---|
| 4,490,015 A | * | 12/1984 | Kawarada et al. | 350/340 |
| 4,786,147 A | | 11/1988 | Clerc et al. | 350/337 |
| 5,504,604 A | | 4/1996 | Takatori et al. | 349/124 |
| 5,710,609 A | | 1/1998 | Shimada | 349/126 |
| 5,717,474 A | * | 2/1998 | Sarma | 349/118 |
| 6,023,317 A | * | 2/2000 | Xu et al. | 349/118 |
| 6,049,252 A | * | 7/2000 | Itoh et al. | 349/180 |
| 6,160,604 A | * | 12/2000 | Murai et al. | 349/143 |

FOREIGN PATENT DOCUMENTS

| | | |
|---|---|---|
| EP | 0 632 311 A1 | 1/1995 |
| EP | 0 732 611 A2 | 9/1996 |
| EP | 0 750 210 A1 | 12/1996 |
| EP | 0 768 560 A1 | 4/1997 |
| GB | 0 310 048 A | 8/1997 |
| GB | 2 318 880 A | 5/1998 |
| JP | 11-352492 | * 12/1999 |

OTHER PUBLICATIONS

UK Search Report Dated Aug. 24, 1998.
UK Search Report Dated Feb. 8, 1999.

* cited by examiner

Primary Examiner—Kenneth Parker
Assistant Examiner—Dung Nguyen
(74) Attorney, Agent, or Firm—Renner, Otto, Boisselle & Sklar

(57) ABSTRACT

A surface mode liquid crystal device, comprising a liquid crystal layer disposed between first and second alignment layers for substantially parallel-aligning the liquid crystal layer, the first alignment layer comprising a plurality of regions defining respective picture elements, each of the regions comprising a plurality of sub-regions, the plurality of sub-regions each comprising at least one first sub-region for aligning the adjacent liquid crystal In a first alignment direction and at least one second sub-region for aligning the adjacent liquid crystal in a second alignment direction substantially different from that of the first alignment direction.

38 Claims, 29 Drawing Sheets

MULTI-DOMAIN SURFACE MODE DEVICE

FIELD OF THE INVENTION

The present invention relates to the field of visual displays and image processing devices such as flat-screen computer displays, televisions, 3D displays, projection devices, time-sequential color systems and head-mount displays.

DESCRIPTION OF RELATED ART

U.S. Pat. No. 4,56,758 discloses a uniformly aligned 180° twisted surface mode liquid crystal. The pi-cell and the chirally doped variant of the pi-cell described in U.S. Pat. No. 4,566,758 are so-called surface mode liquid crystal devices. Both are characterized by having the molecules in the central region of the liquid crystal remaining aligned almost perpendicularly to the cell surfaces during operation of the device, whilst molecules close to the surfaces undergo reorientation in response to varying electric fields. However these devices suffer a disadvantage in that the optical characteristics vary non-uniformly when the device is viewed from different angles. This variation in viewing characteristics with angle is undesirable when designing, for instance, a television screen to be viewed from a wide range of angles.

GB 2 318 880 A discloses a liquid crystal device with two aligned but only one pretilted surface. However embodiments include 90° twisted nematic rather than 180° twisted surface mode device or pi-cell.

EP 0 750 210 A1 discloses a multi-domain liquid crystal device, in which the liquid crystal is mixed with some amount of polymer but no chiral dopant and is preferably 90° twisted.

EP 0 768 560 A1 discloses a mult-domain liquid crystal device in which one surface has vertical alignment.

EP 0 632 311 A1 discloses a multi-domain liquid crystal device which allows an amount of chiral dopant giving d/p<0.75, but does not describe the operation and viewing performance of a 180° twisted surface mode device as in the present invention.

U.S. Pat. No. 5,710,609 describes a 180° twisted liquid crystal device which includes a liquid crystal of negative dielectric anisotropy.

U.S. Pat. No. 5,504,604 describes a multi-domain liquid crystal device which requires first and second liquid crystal layers with first and second pre-tilt angles.

U.S. Pat. No. 4,635,051 discloses the use of pi-cells as switchable optical retardation elements. The pi-cell is a surface switching device which utilizes a positive dielectric anisotropy liquid crystal confined between two surfaces which have been treated such as by rubbing in such a way as to induce unidirectional alignment of the liquid crystal with a small tilt (typically 2–5°) of the molecules away from the surface ('pretilt').

P. D. Berezin et. al., Sov.J.Quant.Electron Vol. 3(1) pp.78–79 (1973) discloses the principle of liquid crystal surface mode switching in the form of a voltage-tunable birefringent waveplate. A layer of nematic liquid crystal is arranged with its optic axis at 45° to the orthogonal polarizing directions of two polarizers. The device is operated between voltages such that significant molecular switching only occurs near the surfaces of the liquid crystal layer.

EP 0 616 240 A1 describes the use of a fixed uniform optical retardation film with optic axis crossed with respect to the rubbing direction of a pi-cell.

FIGS. 1A to 1D of the accompanying drawings illustrate diagrammatically the construction and operation of a typical pi-cell. The cell comprises a substrate 1 of transparent glass or plastic coated with a transparent electrode 2, for instance of indium tin oxide (ITO). The electrode 2 is coated with a thin layer 3 of a polymer, such as polyimide, which is unidirectionally rubbed or buffed so as to define the alignment direction and pretilt angle for nematic liquid crystal molecules 4. The opposite cell wall comprises a substrate 11, an electrode 12 and an alignment layer 13 of the same type as the substrate 1, the electrode 2 and the alignment layer 3, respectively. The cell walls are spaced apart by spherical glass or plastic spacers (not shown) to define a cell thickness which is typically between 1 and 25 micrometers. The cell walls are aligned with their rubbing directions parallel and the cell is sealed so as to contain a layer of liquid crystal material of positive dielectric anisotropy.

The pi-cell is operated with its molecules in a "bend configuration". Above a certain voltage between the electrodes 2 and 12, typically of the order of 2 volts RMS, the liquid crystal director favors the adoption of the bend-configuration with the molecules in the central region 5 of the cell being aligned along the applied electric field. At higher fields, the bend-configuration distorts as more of the molecules align along the direction of the applied field. FIG. 1A illustrates a bend-configuration at a typical operating voltage whereas FIG. 1B illustrates the further distortion which occurs with increased operating voltage. Thus, in the bend-configuration, only the surface regions 6 distort when the applied voltage is varied whereas the central region 5 remains substantially static.

Because liquid crystal materials are optically anisotropic or "birefringent", when the pi-cell is disposed between two polarizers with the surface alignment directions of the cell oriented at 45° to the absorption axes of the polarizers, a variation in optical transmission accompanies distortions in the liquid crystal director structure. Thus, a voltage-tunable optical shutter can be produced and can form the basis of a display device. Usually, when the pi-cell is operated as a transmissive device, a range of operating voltages is selected such that, at a lower operating voltage, the pi-cell exhibits approximately a half-wave optical retardation at a predetermined wavelength (normally approximately 550 nanometers). The device or picture element then appears bright. At an upper operating voltage, the pi-cell exhibits approximately zero optical retardation and so looks dark between the crossed polarizers. Switching between the upper and lower operating voltages produces optical switching between bright and dark states, with intermediate voltages producing intermediate grey levels.

It is known that, if a voltage is applied to a pi-cell in its bend configuration and the voltage is then reduced towards zero, below a certain level which is typically about 2 Volts, a 180° twisted director configuration appears briefly in the cell as illustrated in FIG. 1D. This twisted structure is typically replaced shortly thereafter by the nucleation and growth of the splay configuration.

JP 9-90432 discloses twisted devices with twists of substantially 360°.

WO 97/12275 discloses another type of surface switching liquid crystal device using two parallel aligned surfaces. However, in this case, a relatively high pretilt, typically between 80° and 90°, is produced by the alignment layers and the liquid crystal material is of the negative dielectric anisotropy type.

The 180° twisted surface mode discussed herein is not to be confused with the 180° twisted so-called STN device disclosed, e.g., in UK Patent GB 2 123 163B. The STN is a device designed specifically to exhibit a very sudden change in optical transmission with voltage. This allows it to be used with so-called "multiplex drive schemes" and it does not use an active matrix of, e.g., thin film transistors. The surface mode devices described herein require an active matrix as discussed later in connection with FIG. 12. A disadvantage of the STN device is that its switching speed is relatively slow. In particular, switching between states typically takes more than 100 milliseconds whereas the switching times of typical surface mode devices are on the order of 10 milliseconds. Thus, STN devices are unsuitable for use as video rate displays or in other applications where switching speeds of 20 milliseconds or less are required.

SUMMARY OF THE INVENTION

The present invention relates to surface mode nematic liquid crystal devices with improved angular viewing characteristics. Conventional liquid crystal devices consist of a layer of liquid crystal confined between two glass or plastic substrates. Conventionally these substrates are unidirectionally rubbed or otherwise treated to cause the liquid crystal molecules in contact with the substrate to unidirectionally align. We disclose herein a surface mode device with surfaces treated so as to provide more than a single alignment direction of the liquid crystal (i.e. to produce multi-sub-region or multi-sub-pixel alignment) within a single pixel of the liquid crystal device which is beneficial in improving angular viewing characteristics.

Multi-sub-region alignment of a surface mode device is used to produce a device which is both faster switching than the well-known 90° twisted nematic device, making it more suitable for the display of moving video images, and which has a more uniform viewing characteristic.

The term "surface mode liquid crystal device" as used herein means a liquid crystal device in which the direction of the liquid crystal directors in a middle portion of the liquid crystal layer remote from the surface portions of the liquid crystal layer adjacent alignment layers does not change substantially when the applied field across the liquid crystal layer varies over the operating range of the device.

In one embodiment, the present invention relates to a surface mode liquid crystal device, including a liquid crystal layer disposed between first and second alignment layers for substantally parallel-aligning the liquid crystal layer, the first alignment layer including a plurality of regions defining respective picture elements, each of the regions including a plurality of sub-regions, the plurality of sub-regions each comprising at least one first sub-region for aligning the adjacent liquid crystal in a first alignment direction and at least one second sub-region for aligning the adjacent liquid crystal in a second alignment direction substantially different from that of the first alignment direction.

In one embodiment, in the first alignment layer, the plurality of sub-regions comprises at least two sub-regions, the sub-regions having alignment directions arranged in multiples of 90° with respect to each other. In one embodiment, each plurality of sub-regions comprises four sub-regions. In one embodiment, in both the first and second alignment layers, the plurality of sub-regions comprises at least a first pair and a second pair of sub-regions, the sub-regions in each pair having alignment directions arranged in multiples of 90° with respect to the alignment directions of adjacent sub-regions. In one embodiment, the plurality of sub-regions comprises more than four sub-regions.

In one embodiment, the first alignment layer is arranged to provide a non-zero pretilt.

In one embodiment, the second alignment layer is arranged to align the adjacent liquid crystal with a substantially zero pretilt and the liquid crystal layer is sufficiently chiral to stabilize a substantially 180° twisted liquid crystal director configuration in the absence of an applied field across the liquid crystal layer.

In one embodiment, the liquid crystal layer comprises a nematic liquid crystal and a chiral dopant.

In one embodiment, d/p is greater than or equal to substantially 0.25, where d is the thickness of the liquid crystal layer and p is the pitch which the chiral liquid crystal would have in an unconstrained infinitely thick layer. In one embodiment, d/p is less than 0.75. In one embodiment, d/p is substantially equal to 0.25.

In one embodiment, the liquid crystal layer has a positive dielectric anisotropy.

In one embodiment, the first and second alignment layers are arranged to provide a pretilt of between 1° and 10°. In one embodiment, the first and second alignment layers are arranged to provide a pretilt of between 1 and 5°.

In one embodiment, the first alignment layer is arranged to provide a pretilt of between 1° and 10°. In one embodiment, the first alignment layer is arranged to provide a pretilt of between 1° and 5°.

In one embodiment, the device includes an active matrix addressing arrangement.

In one embodiment, the liquid crystal layer is disposed between first and second polarizers whose polarizing directions are orthogonal and one of whose polarizing direction is aligned substantially at 45° to the alignment direction or the first alignment direction of the first alignment layer.

In one embodiment, the liquid crystal layer is disposed between first and second polarizers whose polarizing directions are substantially parallel and aligned substantially at 45° to the alignment direction or the first alignment direction of the first alignment layer.

In one embodiment, the polarizers are patterned into a plurality of sub-regions with a laterally varying direction of the polarizing axes such that the polarizing axes of each polarizer sub-region lie at 45° to the alignment direction of the liquid crystal sub-region immediately adjacent to the polarizer.

In one embodiment, the liquid crystal layer is disposed between a polarizer and a reflector. In one embodiment, the polarizer is patterned into a plurality of sub-regions with a laterally varying direction of the polarizing axes such that the polarizing axes of each polarizer sub-region lie at 45° to the alignment direction of the liquid crystal sub-region immediately adjacent to the polarizer.

In one embodiment, the device includes a first fixed retarder for reducing the retardation of the liquid crystal layer. In one embodiment, the first fixed retarder is of positive birefringence and has an optic axis substantially perpendicular to the alignment direction or the first alignment direction of the first alignment layer. In one embodiment, the first fixed retarder is of negative birefringence and has an optic axis substantially parallel to the alignment direction or the first alignment direction of the first alignment layer. In one embodiment, the device includes a second fixed retarder of negative birefringence having an optic axis substantially perpendicular to the liquid crystal layer.

In one embodiment, the retarder used for reducing the retardation of the liquid crystal layer comprises a plurality of regions with optic axis in each region aligned perpendicular to the alignment direction of the adjacent liquid crystal region.

In one embodiment, the first alignment direction and the second alignment direction lie at a non-integral multiple of 90° with respect to each other.

BRIEF DESCRIPTION OF THE DRAWINGS

The Invention will be further described, by way of example, with reference to the accompanying drawings, in which.

DETAILED DESCRIPTION

Figure 1A:
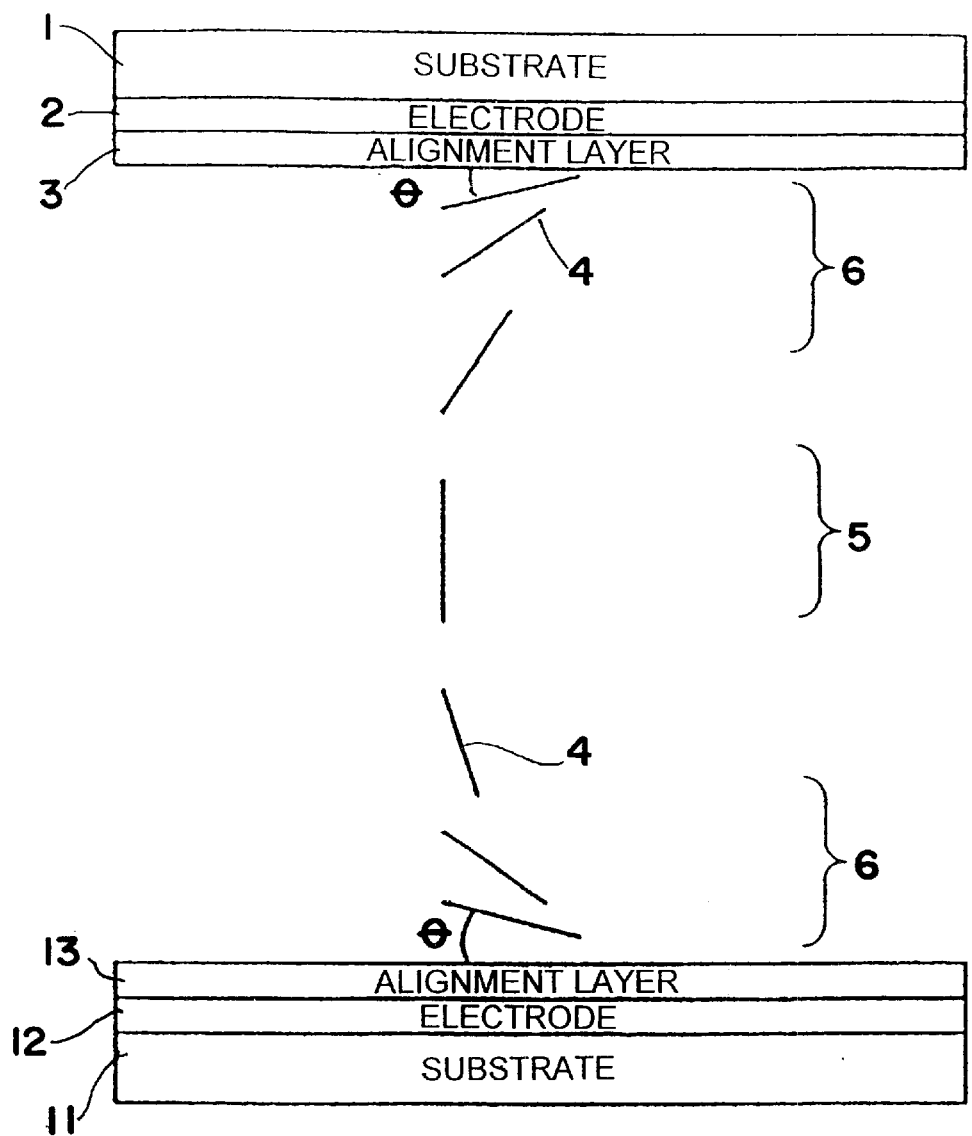
FIGS. 1A to 1D are diagrammatic cross-sectional views of a known pi-cell illustrating liquid crystal director configurations.
Figure 1B:
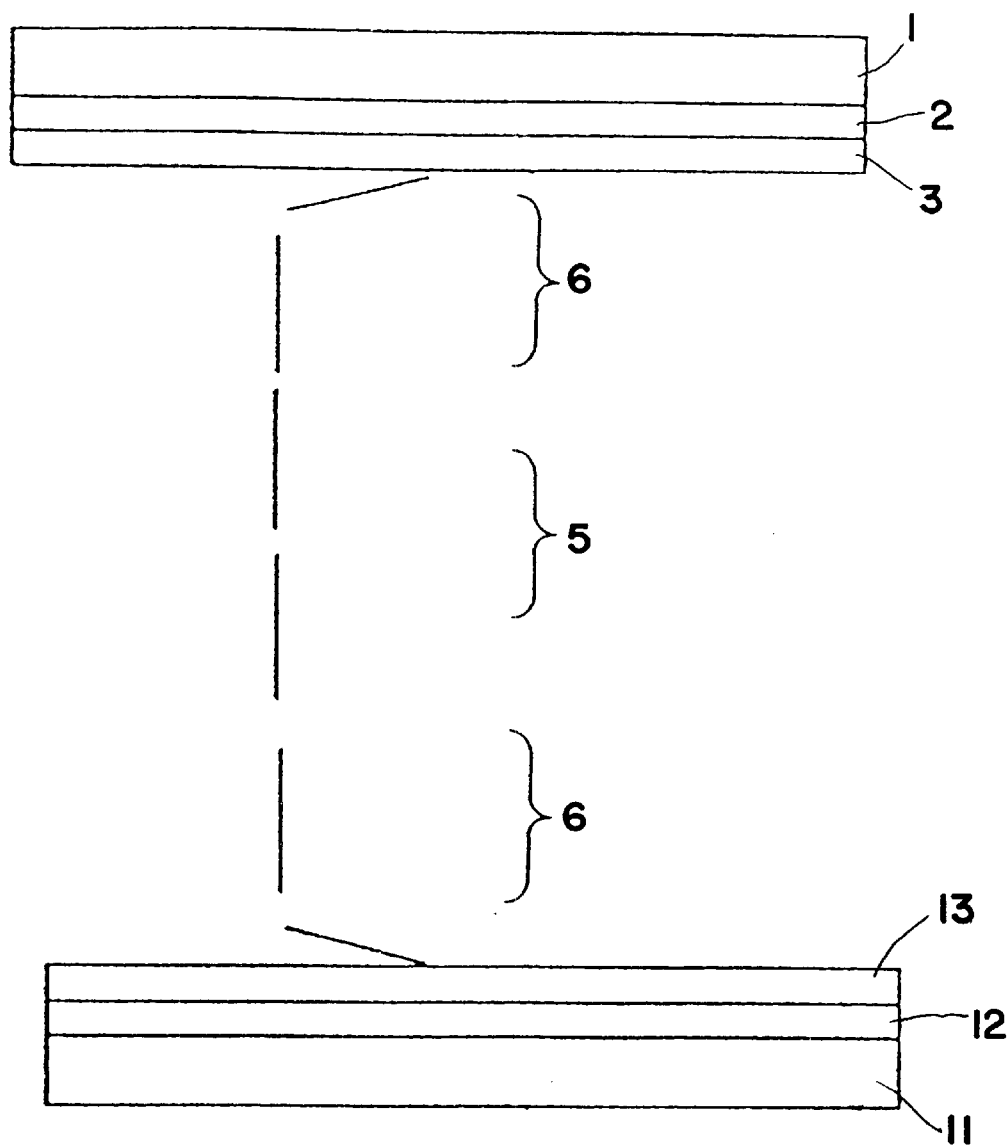
Figure 1C:
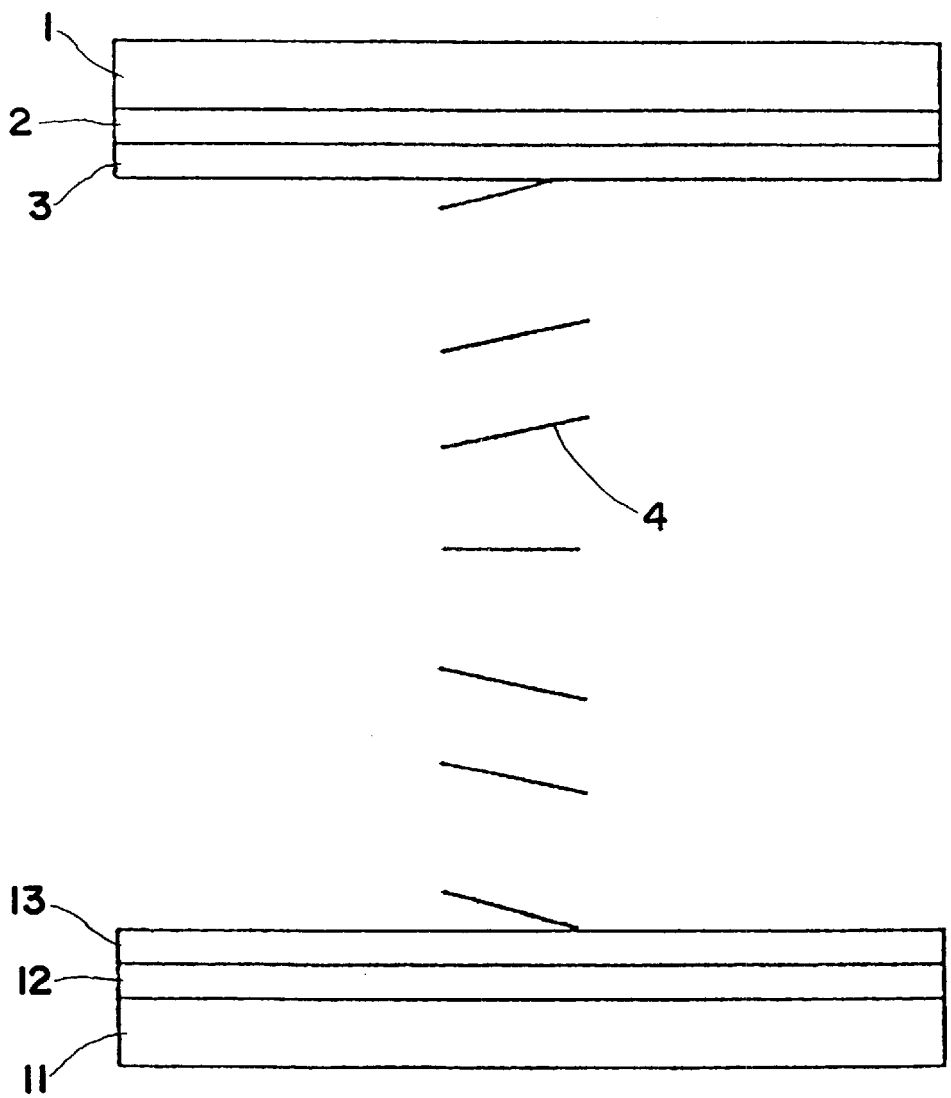

Like reference numerals refer to like parts throughout the drawings.

Figure 2:
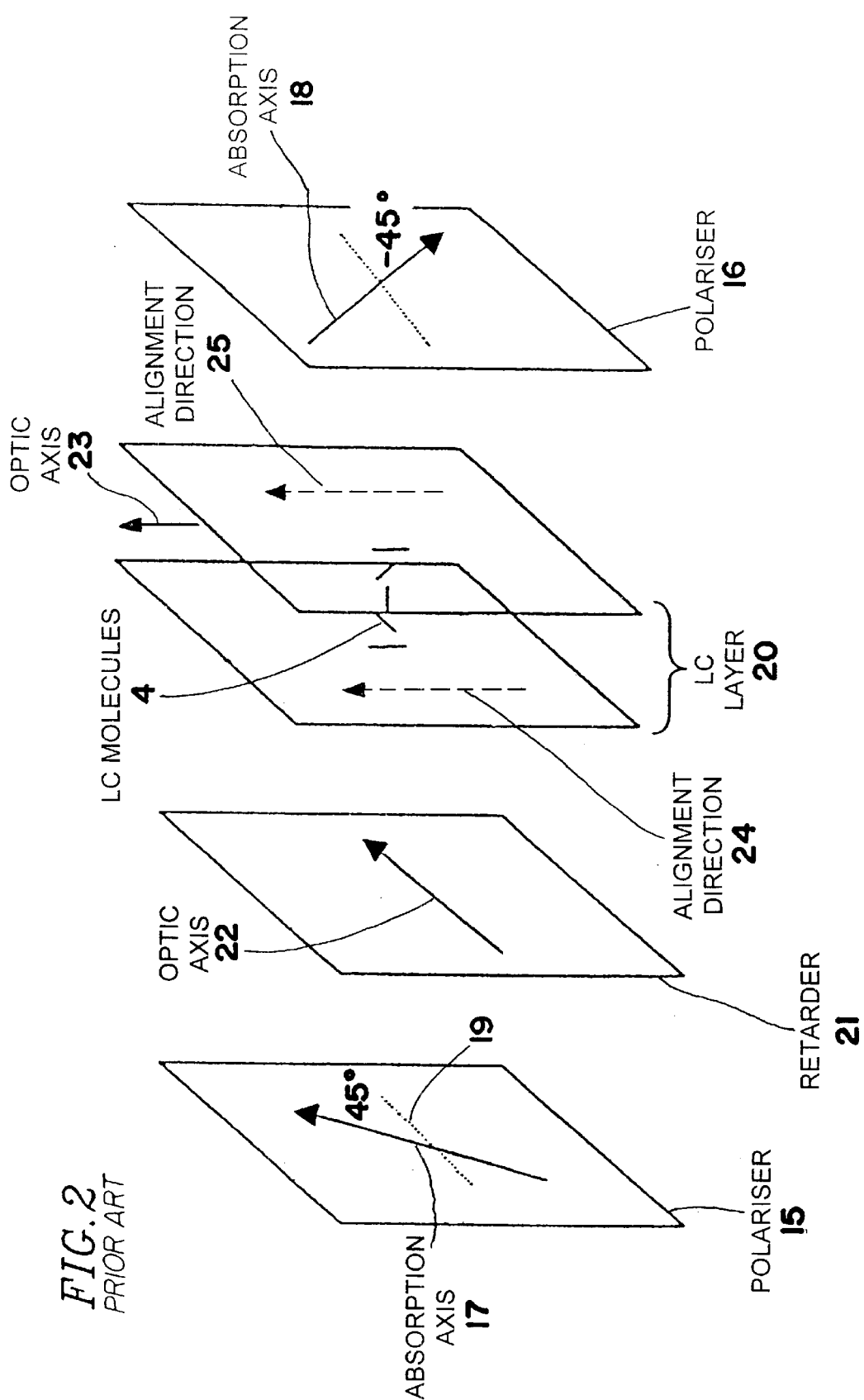
FIG. 2 is a perspective exploded view illustrating a transmissive liquid crystal device constituting a conventional arrangement of a surface-mode liquid crystal device.

FIG. 2 illustrates a transmissive surface mode liquid crystal device (LCD) comprising first and second polarizers 15 and 16 whose absorption axes 17 and 18 are orthogonal. The absorption axis 17 Is aligned at 45° to a reference direction 19 whereas the absorption axis 18 is aligned at −45° to the reference direction 19. As an alternative both a retarder of negative birefringence and a retarder of positive birefringence may be present.

A liquid crystal layer 20 and a fixed retarder 21 are disposed between the polarizers 15 and 16. The retarder 21 is of positive birefringence and is of uniform type with an optic axis 22 parallel to the direction 19. As an alternative, the retarder 21 may be of negative birefringence and the optic axis 22 may be perpendicular to the direction 19. As an alternative both a retarder of negative birefringence and a retarder of positive birefringence may be present.

The liquid crystal layer 20 has an optic axis 23 which is perpendicular to the direction 19. The optic axis 23 Is effectively defined by the liquid crystal alignment and the alignment directions of the two surfaces of the liquid crystal layer 20 are shown at 24 and 25. The electric field applied across the layer 20 is varied so as to vary the retardation of the layer 20. The retardation of the layer 20 cannot be reduced to zero for a finite applied field. However, the retardation of the retarder 21 is effectively subtracted from the retardation of the layer 20 so that the device can achieve zero retardation for a finite operating voltage and the resulting applied field.

The device has a structure of the type illustrated in FIGS. 1A to 1D. In particular, the liquid crystal layer 20 is confined within a cell formed by the substrates 1, 11, the electrodes 2, 12 and the alignment layers 3, 13. The polarizers 15 and 16 and the retarder 21 are formed outside the cell, for example directly on the substrates 1, 11. Alternatively, any of the polarizers 15 and 16 and the retarder 21 may be disposed between the substrates 1 and 11.

The liquid crystal of the layer 20 comprises a nematic liquid crystal material, for instance of the type known as E7, and a chiral dopant, for instance of the type known as CB15, both of which are available from Merck Ltd, Darmstadt, Germany. Alternatively, a chiral nematic liquid crystal material may be used. The amount of chiral dopant or the chirality of a chiral nematic liquid crystal material is such that, in the absence of an applied field across the liquid crystal layer 20, a 180° twisted liquid crystal director configuration exists in the layer 20.

The retardations of the retarder 21 and the layer 20 are chosen such that, for a relatively low applied voltage such as 2.262 volts RMS, the retardation of the device is substantially equal to an odd number of half waves, preferably one half wave, at a predetermined wavelength of light, such as 550 nanometers which approximately corresponds to the middle of the visible spectrum. In this state, linearly polarized light from the polarizer 15 has its polarization vector rotated by 90° so as to pass through the polarizer 16. The device is therefore in its transmissive state and is referred to as a normally white device.

When an upper operating voltage is applied to the layer 20, the retardation of the device is reduced to an even number of waves, preferably zero, so that the combination of the retarder 21 and the layer 20 has no effect on the polarization vector. The device therefore acts substantially as crossed polarizers and is in its non-transmissive state.

As an alternative, the absorption axes 17 and 18 of the polarizer 15 and 16 may be parallel to each other. In this case, the device is in its non-transmissive mode for the lower operating voltage and in its transmissive mode for the upper operating voltage. The device is therefore of the normally black type.

Figure 3:
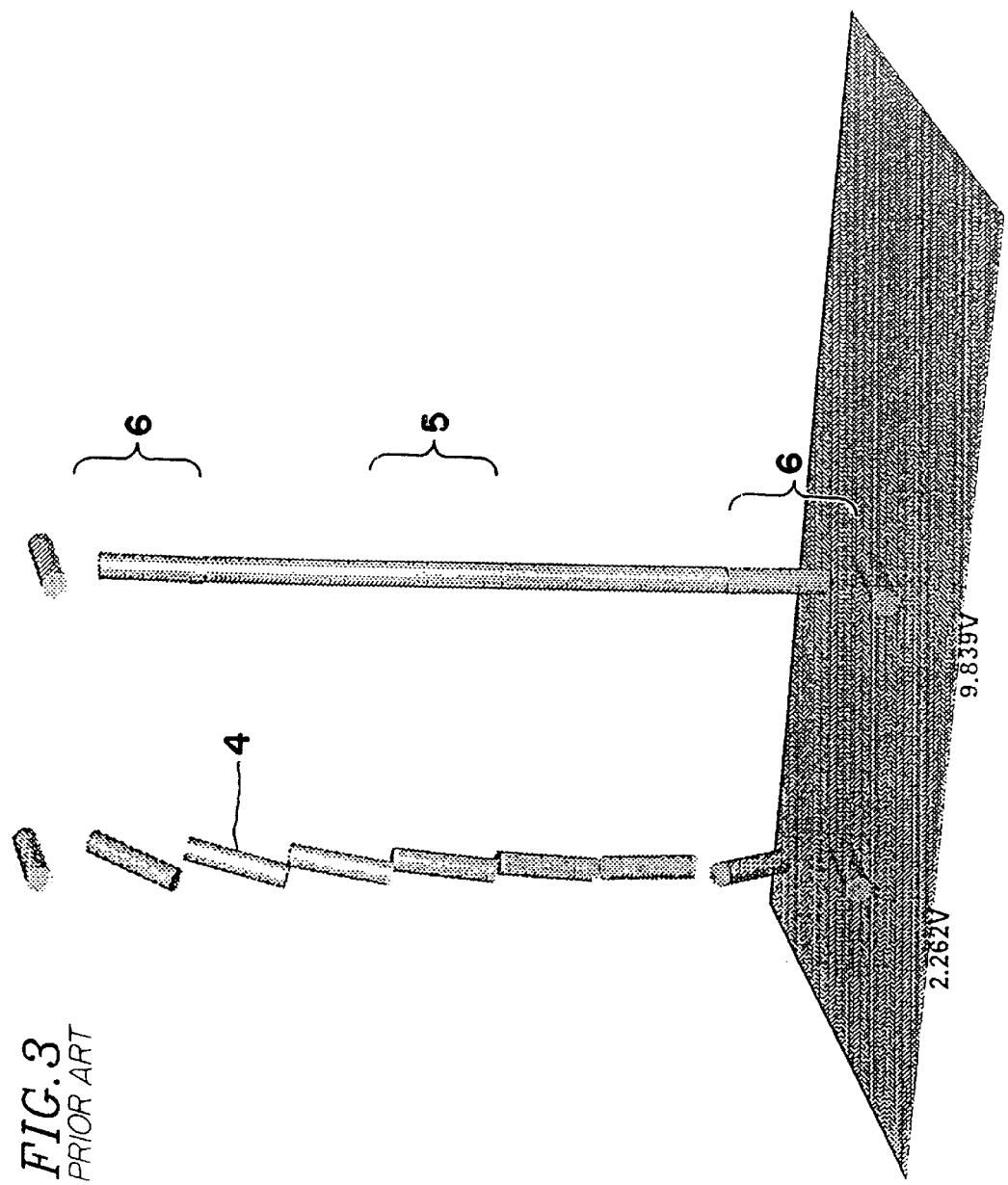
FIG. 3 is a diagram illustrating liquid crystal director configurations at upper and lower operating voltages of the device of FIG. 2.

A typical upper operating voltage is 9.839 volts RMS and FIG. 3 illustrates the director configurations of the layer 20 for the upper and lower operating voltages. These configurations are similar to the pi-cell configurations illustrated in FIGS. 1A and 1B but include a 180° twist. In the central region 5 of the layer, the liquid crystal directors change direction very little throughout the operating voltage range. The device therefore operates as a surface mode liquid crystal device with switching mainly taking place in the surface regions 6. The device operates in much the same way as a pi-cell and, in particular, has similar switching speeds.

Figure 1D:
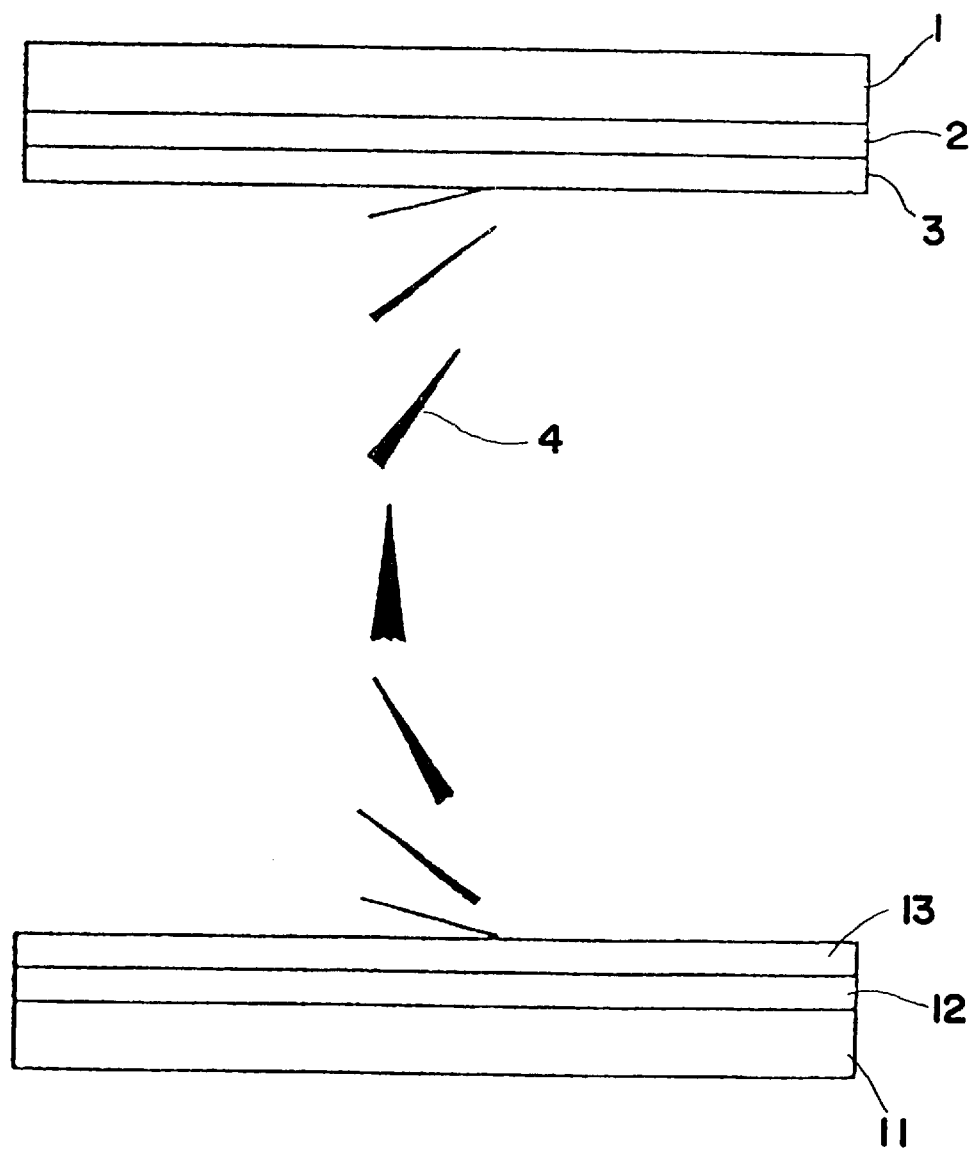

In the absence of an applied voltage to the device, the chirality of the liquid crystal layer 20 is such that the director configuration relaxes to the 180° twisted state illustrated in FIG. 1D. Thus, when the device is switched on again and an addressing waveform supplied to the device, the delay associated with the creation of the bend configuration from the splay configuration in a pi-cell is substantially eliminated and any residual delay as the director configuration changes to that corresponding to the applied voltage is relatively small.

A first example of the device illustrated in FIGS. 2 and 3 has polyimide alignment layers 3, 13 rubbed with a soft cloth and the cells walls aligned so that the alignment directions are substantially parallel. The liquid crystal layer 20 has a thickness of 6.2 micrometers and the alignment layers provide a pretilt of 2°. The retarder 21 has a retardation of 72 nanometers and is made, for example, of a transparent plastic material such as polymethylmethacrylate (PMMA) available from Comar, Cambridge, UK. The material of the liquid crystal layer 20 is as described hereinbefore and the chirality is such that d/p=0.26, where d is the thickness of the layer 20 and p is the unconstrained pitch of the material of the layer 20.

Figure 4:
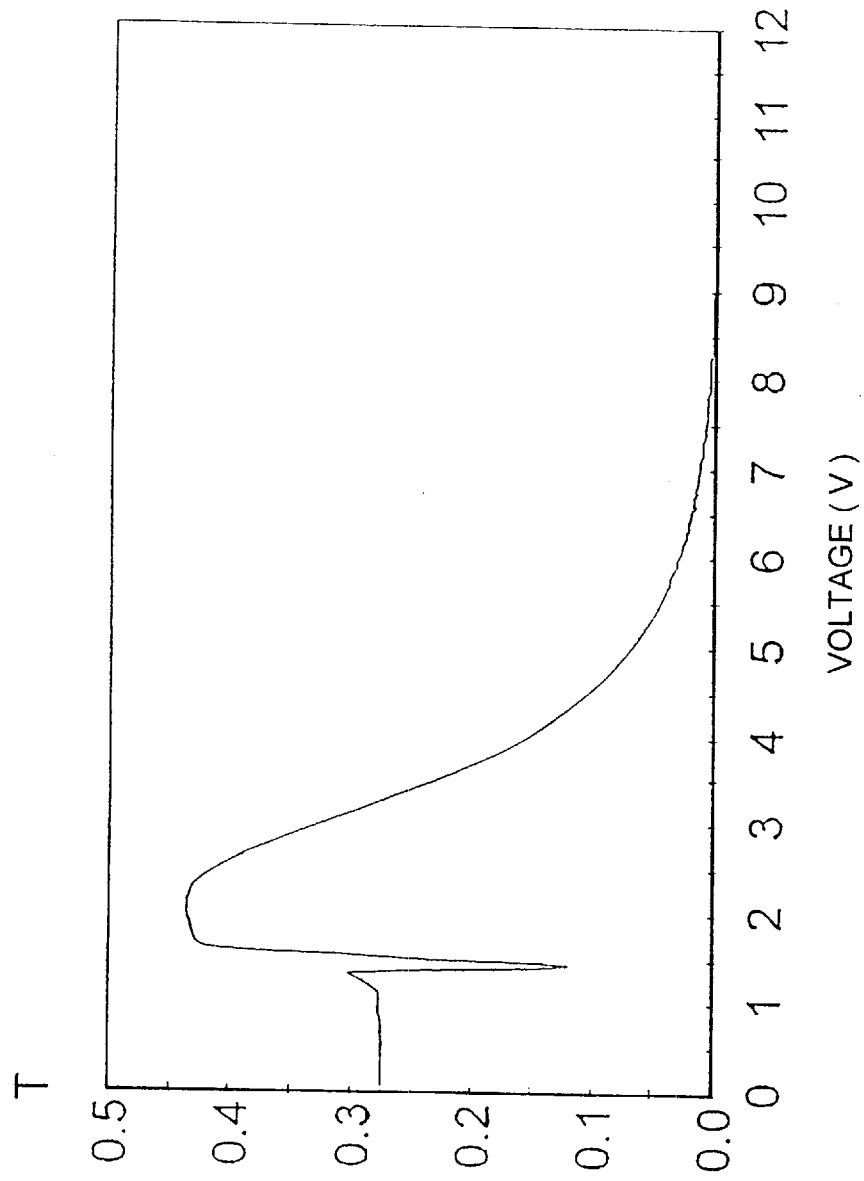
FIG. 4 is a graph of transmission in arbitrary units against applied voltage for a first example of the device shown in FIG. 2.

FIG. 4 illustrates the electro-optic characteristic of this example. A good non-transmissive or black state is achieved for an operating voltage of between 9 and 10 volts RMS and a good transmissive or white state is achieved for an operating voltage of between 2 and 2.5 volts RMS. The optical performance is therefore similar to that of a conventional pi-cell.

Figure 5:
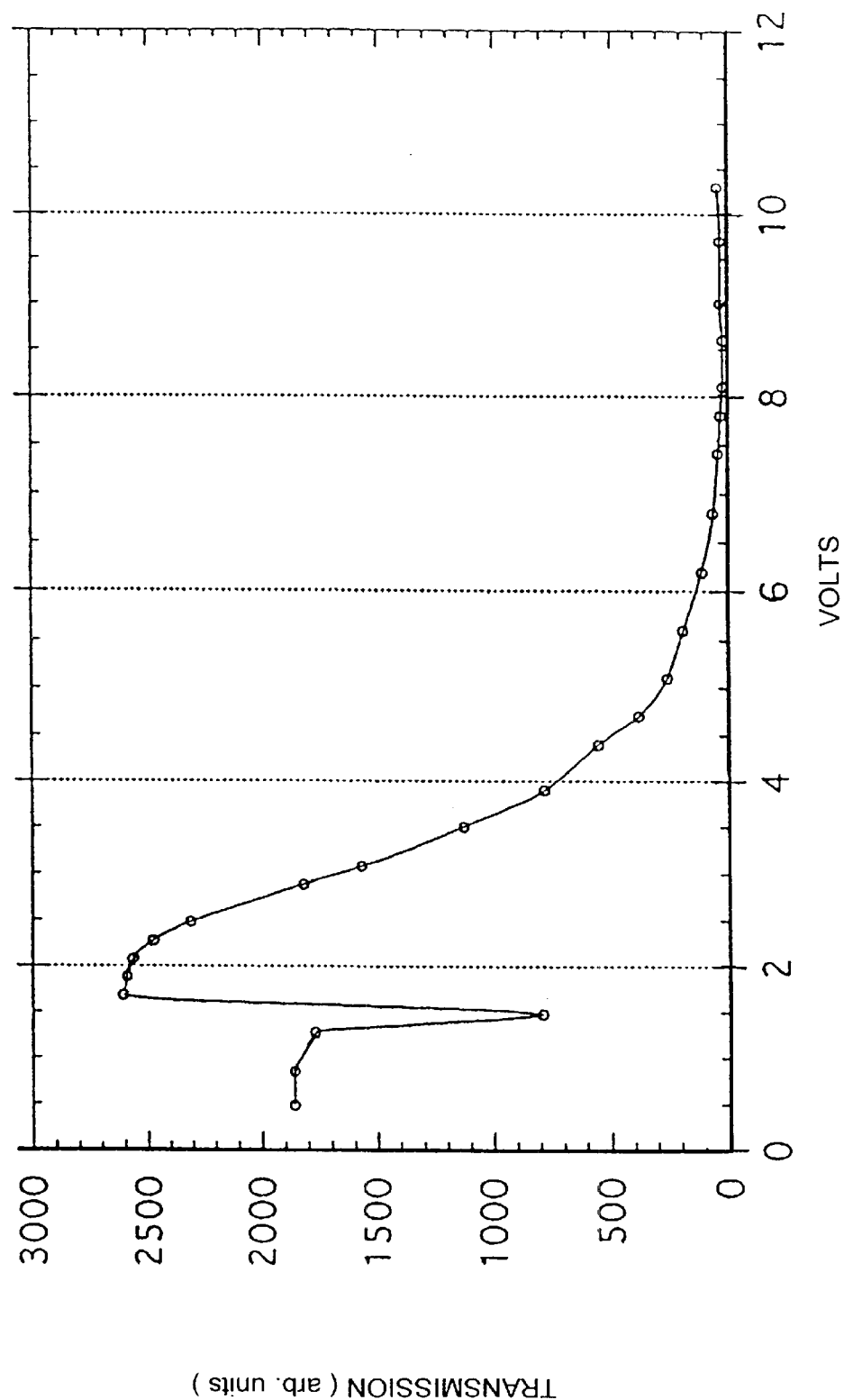
FIG. 5 is a graph of transmission in arbitrary units against applied voltage for a second example of the device of FIG. 2.
Figure 6:
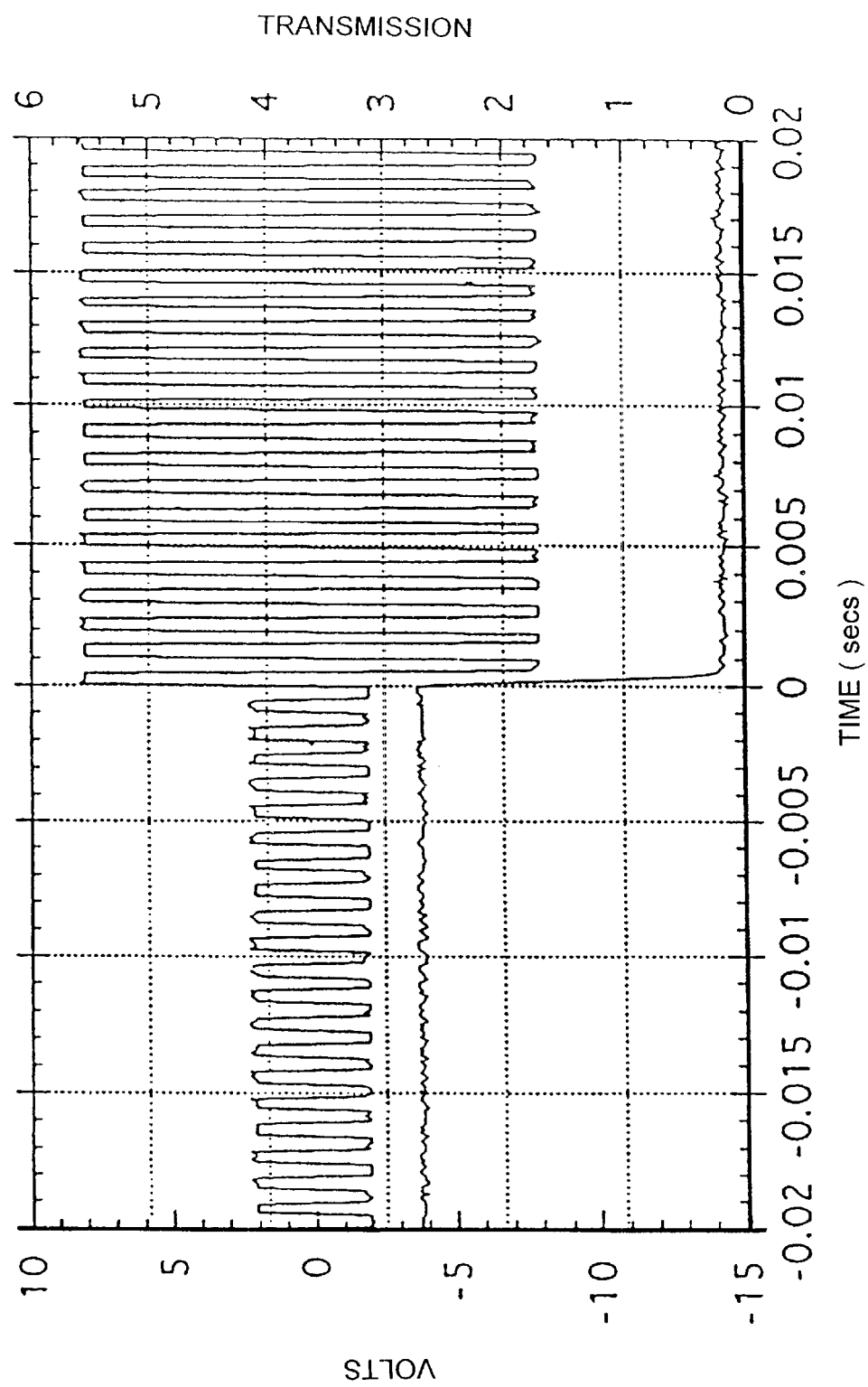
FIG. 6 is a graph of voltage against time illustrating a switching waveform for the second example for switching from a transmissive to a non-transmissive state.
Figure 7:
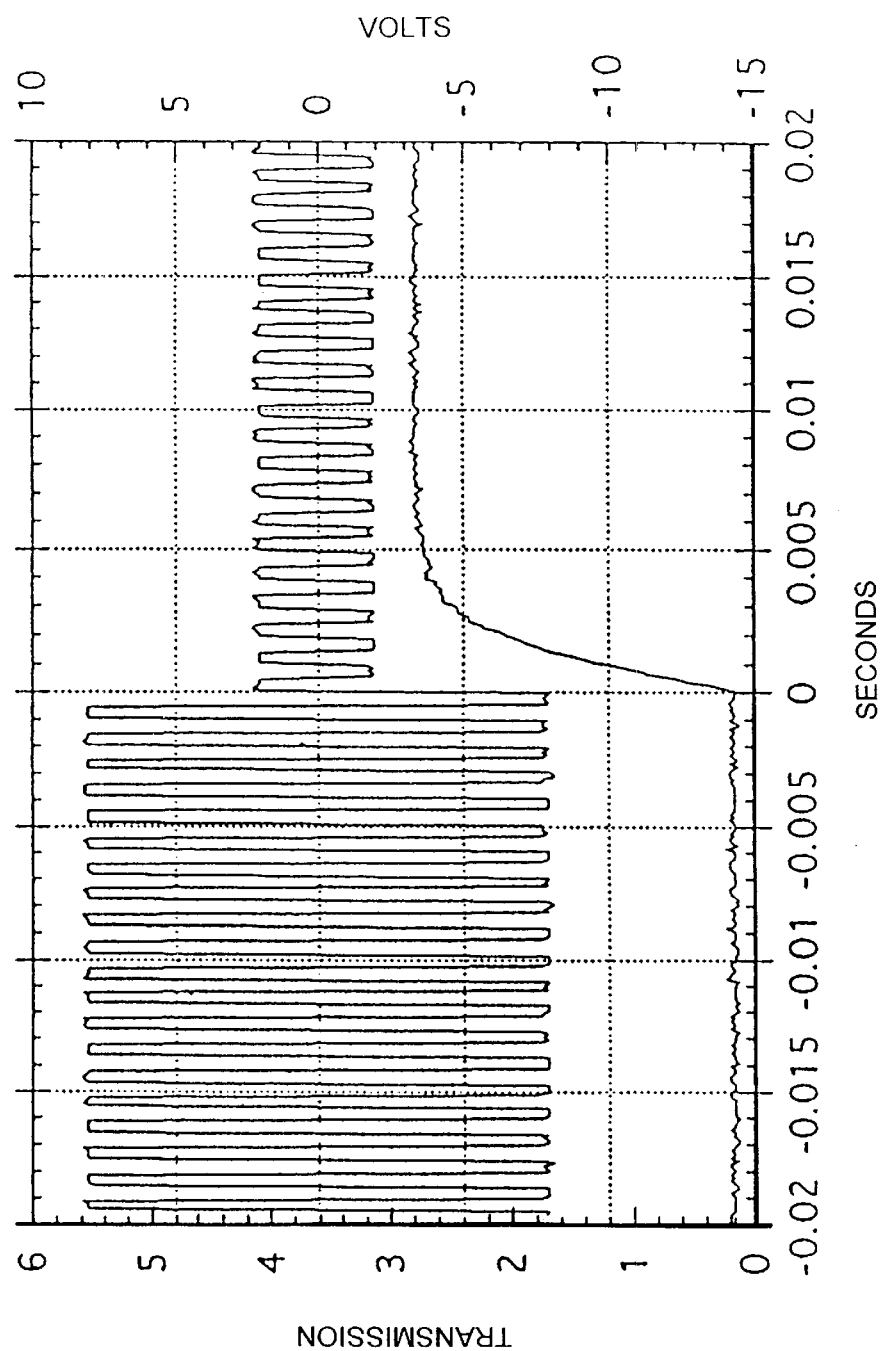
FIG. 7 is a graph of voltage against time illustrating a switching waveform for the second example for switching from a non-transmissive to a transmissive state.

A second example of the device of FIG. 2 differs from the first example in that the thickness of the layer 20 is 6.3 micrometers. FIG. 5 illustrates the electro-optic characteristics of this example and FIGS. 6 and 7 illustrate the dynamic switching performance between transmissive and non-transmissive states. The lower operating voltage is 2.3 volts RMS whereas the upper operating voltage is 8.5 volts RMS.

As shown in FIG. 6, the device switches from the transmissive to the non-transmissive state in less than one millisecond. As shown in FIG. 7, the device switches from the non-transmissive to the transmissive state in less than five milliseconds.

The use of a chiral dopant or a chiral material to provide a value of d/p substantially equal to or greater than 0.26 produces a 180° twisted configuration which avoids the splay/bend nucleation problems associated with conventional pi-cells. It is believed to be preferable to make d/p close to approximately 0.25 in devices where the pretilt is of the order of one to five degrees so as to achieve the best viewing angle performance at low voltages, for instance of the order of two volts. However, if viewing angle is not a major concern, higher dip values may be used. The value should be less than 0.75 so as to avoid the possibility of the formation of a 360° twisted configuration.

The requirement for d/p to be greater than or approximately equal to 0.26 in order for the device to be stable in a 180° twist state at all voltages does exhibit a small dependence upon the value of pretilt and on the elastic constants of the liquid crystal. For example, in a device with a pretilt of the order of 20°, normal liquid crystal materials exhibit a 180° twisted configuration at zero applied field with slightly less chiral dopant or less chirality of the material, for instance, with d/p=0.21.

Figure 8:
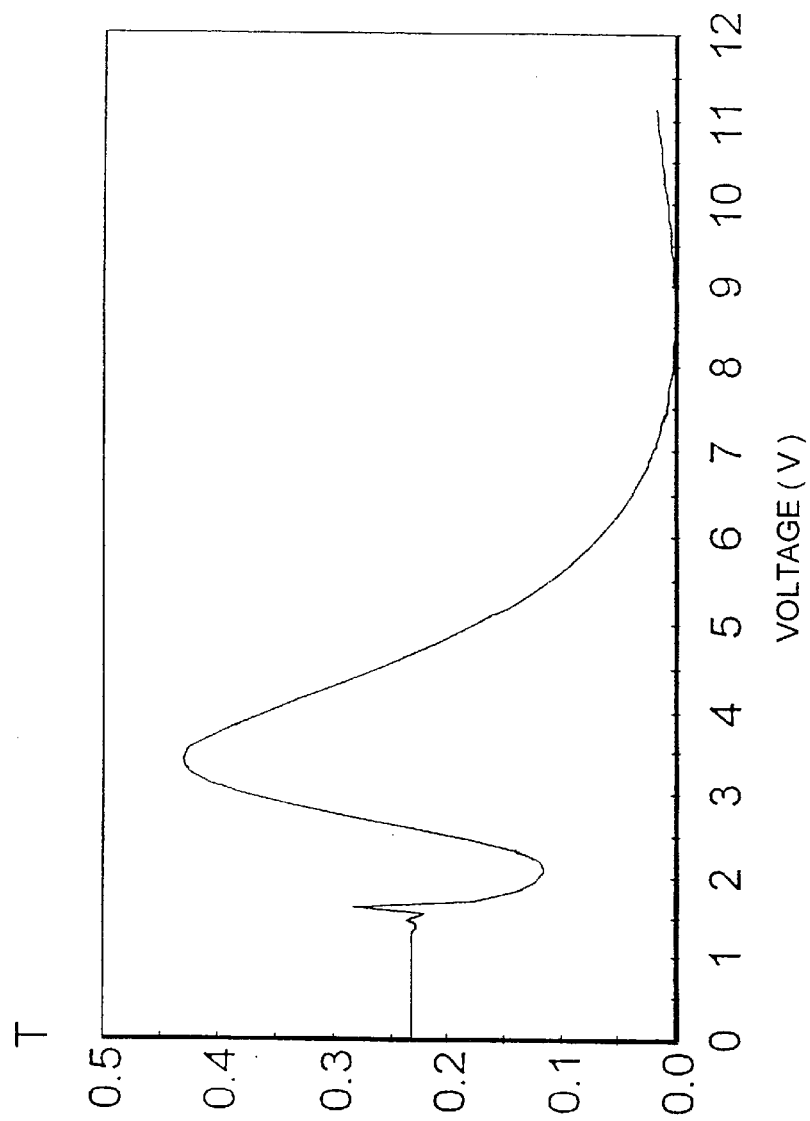
FIG. 8 is a graph of transmission in arbitrary units against applied voltage for a third example of the device of FIG. 2.

The shape of the electro-optic(transmission/voltage) characteristic may be altered by varying the thickness of the liquid crystal layer 20 and/or the retarder 21 and/or by varying the optical anisotropy or birefringence of the liquid crystal layer 20 and/or the retarder 21. For example, FIG. 8 illustrates the characteristic for a third example of the device of FIG. 2. In this case, the thickness of the liquid crystal layer 20 is 12.4 micrometers whereas the retarder 21 has a retardation of 165.5 nanometers. It is thus possible to tune the voltage range over which the device operates and this facility may be used, for example, to provide devices having lower operating voltages which are compatible with thin film transistors (TFTs).

Figure 9:
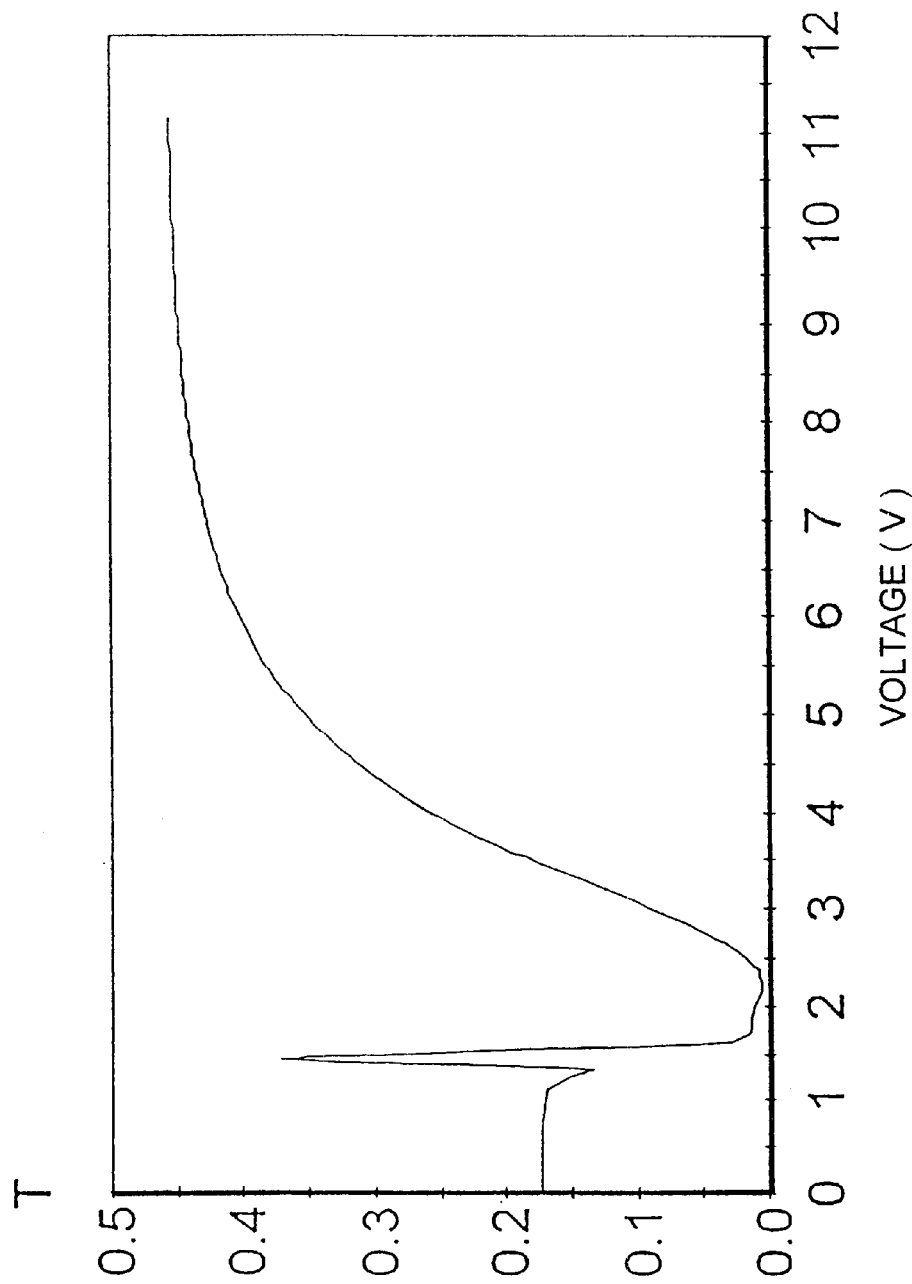
FIG. 9 is a graph of transmission in arbitrary units against applied voltage for a fourth example of the device of FIG. 2.

This is further illustrated by the characteristic shown in FIG. 9, which is achieved by a device whose liquid crystal layer has a thickness of 6.2 micrometers but in which the retarder 21 has a retardation of 330 nanometers.

Figure 10:
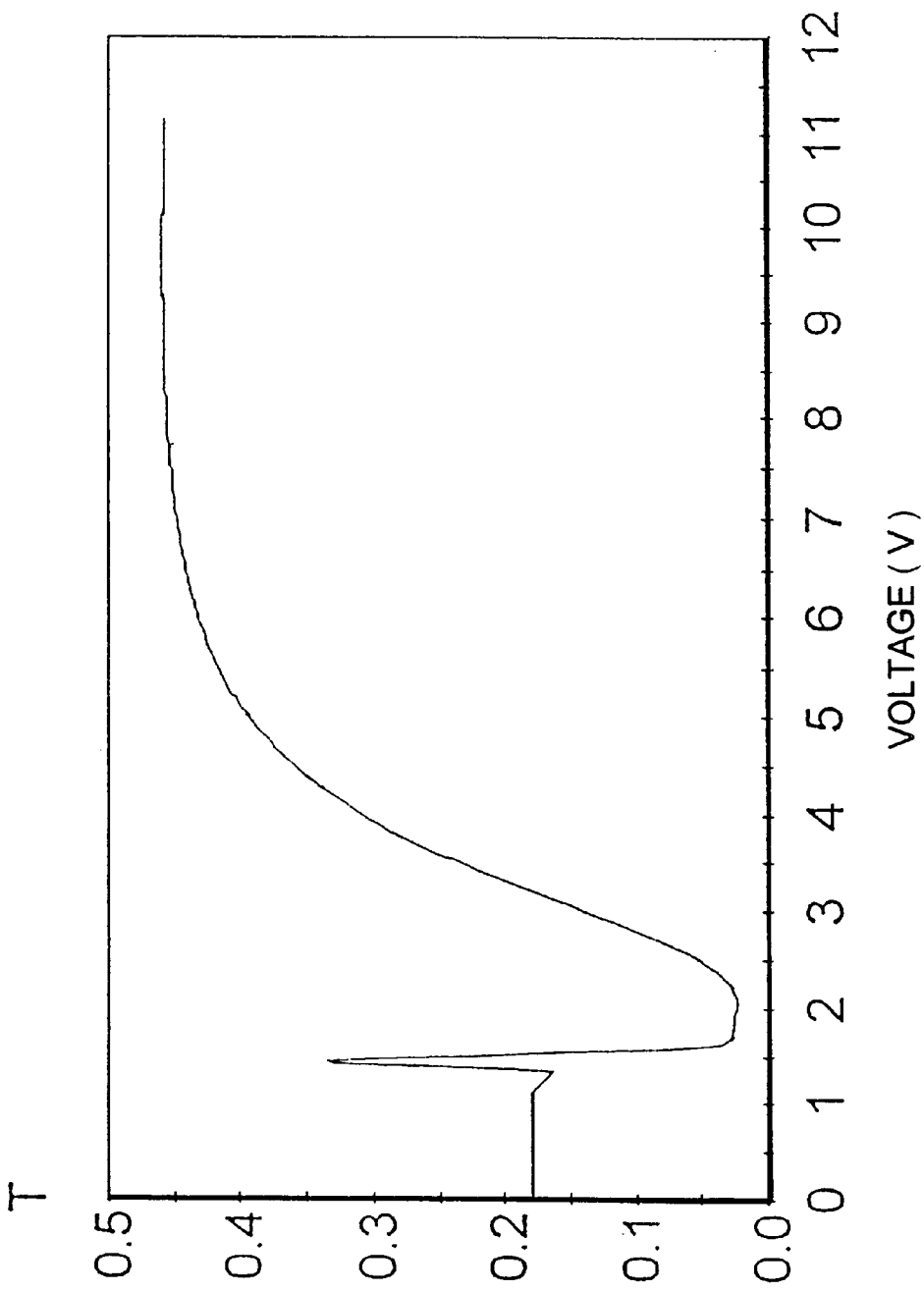
FIG. 10 is a graph of transmission in arbitrary units against applied voltage for a device which differs from the first example in having parallel polarizers.

As described hereinbefore, the absorption axes 17 and 18 of the polarizers 15 and 16 may be parallel so as to provide a normally black device. This is illustrated in FIG. 10 for a fourth example of the device which differs from the first example only in that the polarizers have parallel absorption axes. Thus, FIGS. 4 and 10 illustrate the performance for devices which differ only in the relative orientation of the polarization absorption axes. The normally white device allows a lower minimum transmission or black state to be achieved and this mode of operation is generally preferred for image display systems such as television screens.

Figure 11:
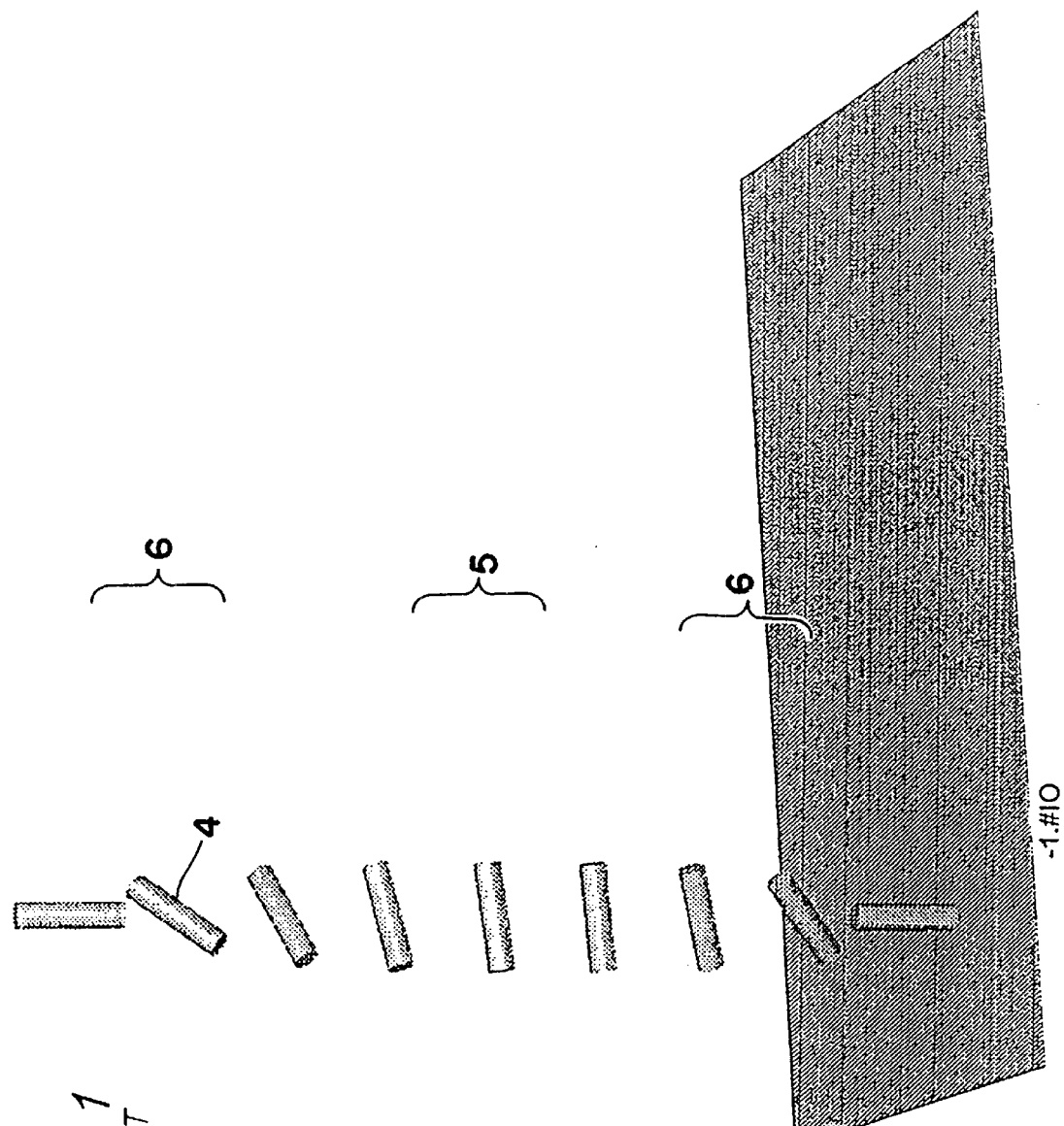
FIG. 11 is a diagram illustrating the liquid crystal director configuration of a splay configuration device at a typical operating voltage.

FIG. 11 Illustrates a fifth example of the device shown in FIG. 2. This device is of a type similar to that disclosed in WO 97/12275 in that the liquid crystal of the layer 20 is of the negative dielectric anisotropy nematic type, such as ZLI 4788-000 available from Merck Ltd. Dahmstadt, Germany. The layer 20 has a thickness of 10 micrometers and the alignment layers provide a surface pretilt of 88. The amount of chiral dopant, such as CB15, is such as to ensure that the director configuration is stable for a zero applied field and retains a 180° twist for no applied field and for all operating voltages. The contents of WO 97/12275 are incorporated herein by reference.

Figure 12:
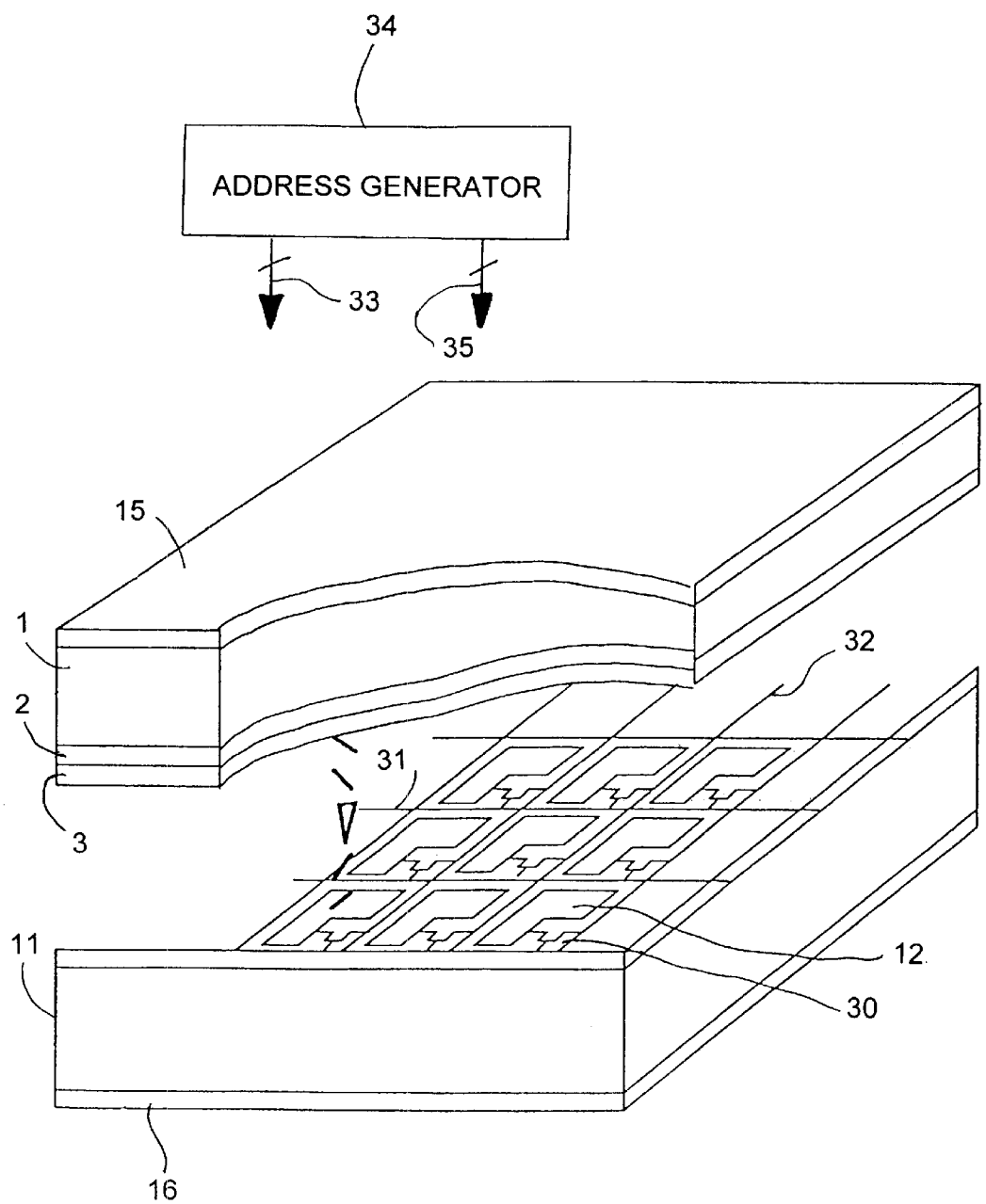
FIG. 12 is a diagrammatic view of a thin film transistor active matrix display constituting an embodiment of the invention.

FIG. 12 illustrates an active matrix addressing arrangement of the device shown in FIG. 2. A substrate 11 carries an array of thin film transistors such as the transistors 30. Each of the transistors 30 controls a picture element (pixel) electrode 12. The gates of the transistors 30 of each row of pixels are connected to a common strobe line 31 whereas the sources of the transistors of each column of pixels are connected to a common data line 32. The strobe lines 31 are connected to respective outputs 33 of an address generator 34 whereas the data lines 32 are connected to respective outputs 35 of the address generator 34. The pixels are refreshed a row at a time with image data for the next field or frame to be displayed by the device.

Although the active matrix device shown in FIG. 12 uses thin film transistors, other voltage regulating elements may be used, such as metal-insulator-metal diodes (MIMs) or channels with ionizing gas to form a plasma addressed liquid crystal (PALC) device.

Figure 13:
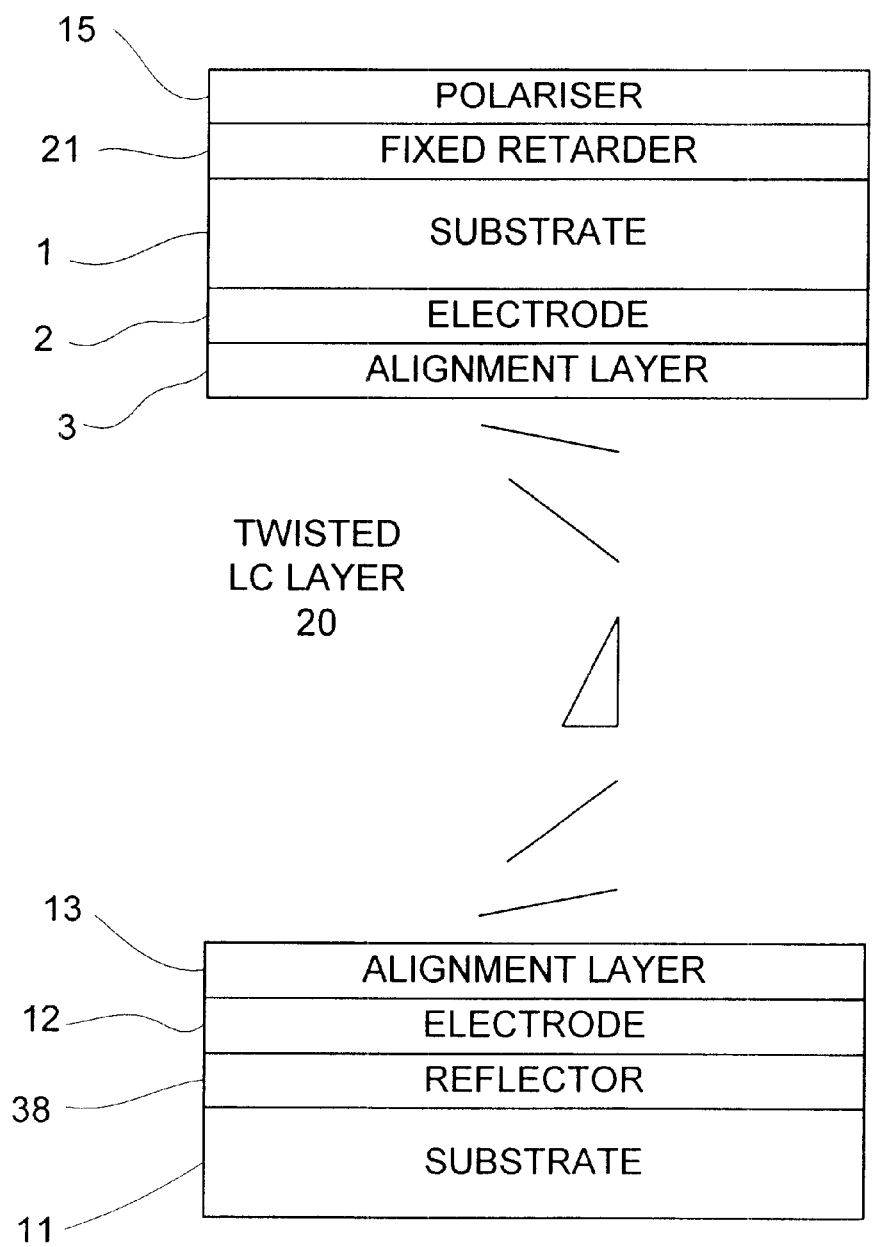
FIG. 13 is a diagrammatic cross-sectional view of a reflective liquid crystal device.

The devices described hereinbefore are of the transmissive type, for instance using a light source behind the liquid crystal layer 20 to illuminate the displayed image. However, reflective or transflective devices may also be formed and FIG. 13 illustrates a reflective mode device. The device shown in FIG. 13 differs from that illustrated in FIG. 2 in that a reflector 38 is disposed between the substrate 11 and the electrode 12. Aternatively, the electrode 12 may be made reflective. Also, the polarizer 16 is omitted and the polarizer 15 and the fixed retarder 21 are disposed on the outside surface of the substrate 1. Alternatively, the polarizer 17 may be disposed between the substrate 1 and the layer 20 and the retarder 21 may be disposed between the polarizer 15 and the reflector 38. By providing these components internally, parallax problems may be reduced so as to improve the viewing angle performance of such a reflective display.

Such devices may be operated in other ways. For instance, such devices may form part of a diffractive optical system and may provide a switchable optical diffraction grating for the use in projecting display systems or image processing systems. Arrangements of this type are disclosed in EP 0 811 872, the contents of which are incorporated herein by reference.

More than one such device may be provided in an optical system. For instance, in projection systems, three separate liquid crystal devices may be used for individually modulating the red, green and blue light components of the projected image.

Optical films may be used with devices of the type described hereinbefore in order to alter the viewing angle characteristics. For example, in devices such as television screens, it is generally desirable to provide a wide viewing angle from which the display may be satisfactorily viewed. In other devices such as aircraft cockpit displays, it may be preferable to reduce the viewing angle from which the display may be viewed in favor of enhancing the brightness at selected angles.

Figure 14:
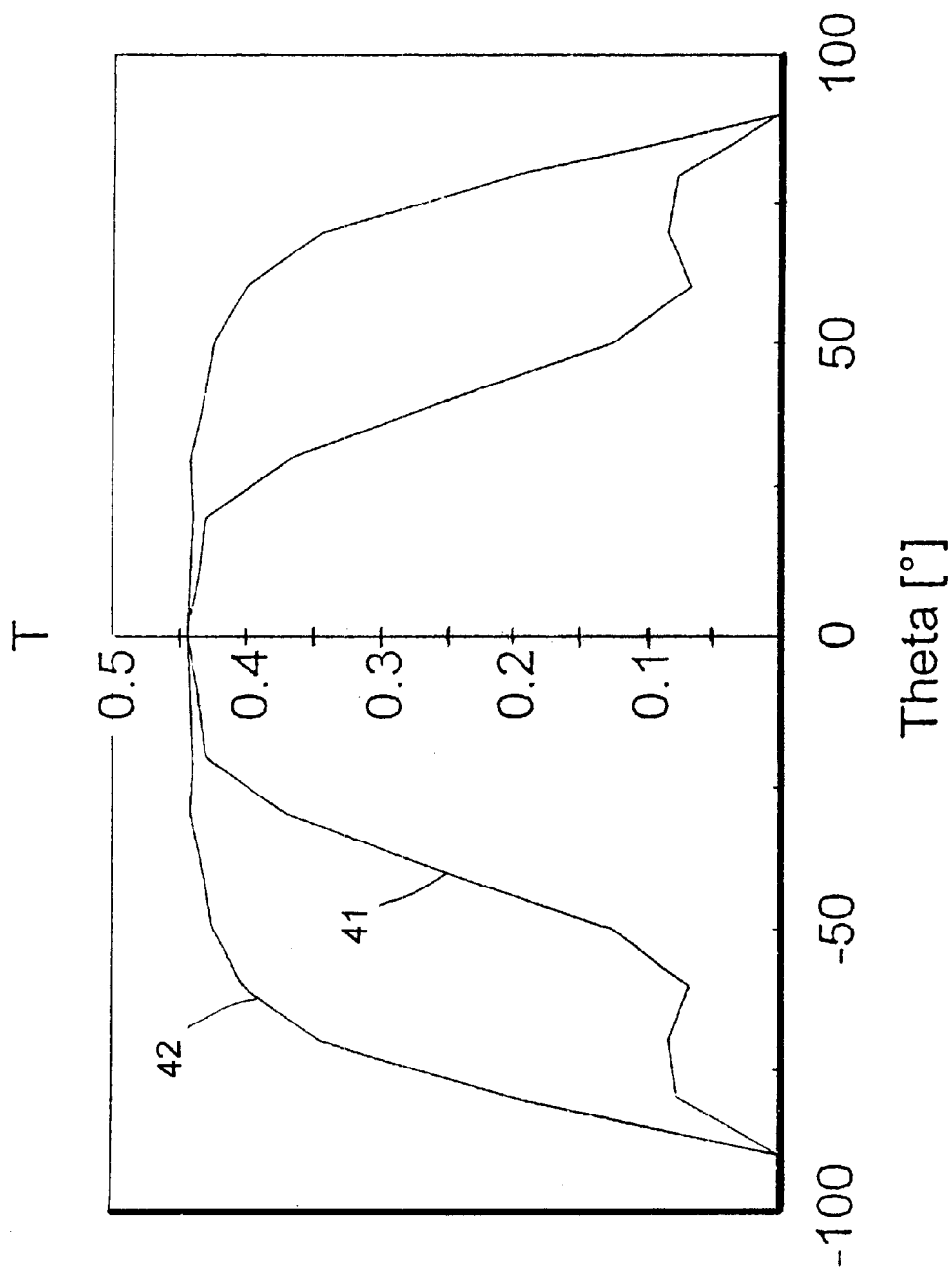
FIG. 14 is a graph of transmission in arbitrary units against horizontal viewing angle illustrating an improvement provided by an additional retarder.

One or more viewing angle compensation films may be used with the devices described hereinbefore. For instance, FIG. 14 illustrates at 41 the horizontal viewing angle characteristics of the first example of the device of FIG. 2 described hereinbefore. The characteristic at 42 illustrates the wider viewing angle which may be obtained by disposing on the device a fixed retarder of negative optical anisotropy having an optic axis aligned to be perpendicular to a plane containing the optic axes 22 and 23 of the retarder 21 and the liquid crystal layer 20.

The devices described hereinbefore may be used as part of a time sequential color display. The principle of time sequential color devices is well known in the field of liquid crystal displays. Instead of using color filters to display color images, an illumination system capable of sequentially producing different primary colors is used. For example, to display a color image, the information corresponding to the red component of the image is isolated and written to the liquid crystal device. The device is then illuminated with red light. This procedure is repeated for green and blue light. The procedure occurs at a sufficient rate, typically corresponding to five milliseconds or less per color image, that the human eye does not detect the individual color frames but instead integrates them to give the impression of a single multicolor image. The devices described hereinbefore have sufficiently fast switching performance for use in such time sequential color systems.

As described hereinbefore and illustrated in FIG. 7, the switching time from the non-transmissive state to the transmissive state is slower than the switching time from the transmissive state to the non-transmissive state as illustrated FIG. 6. This relaxation time is partly determined by the difference between the corresponding operating voltages.

Figure 16:
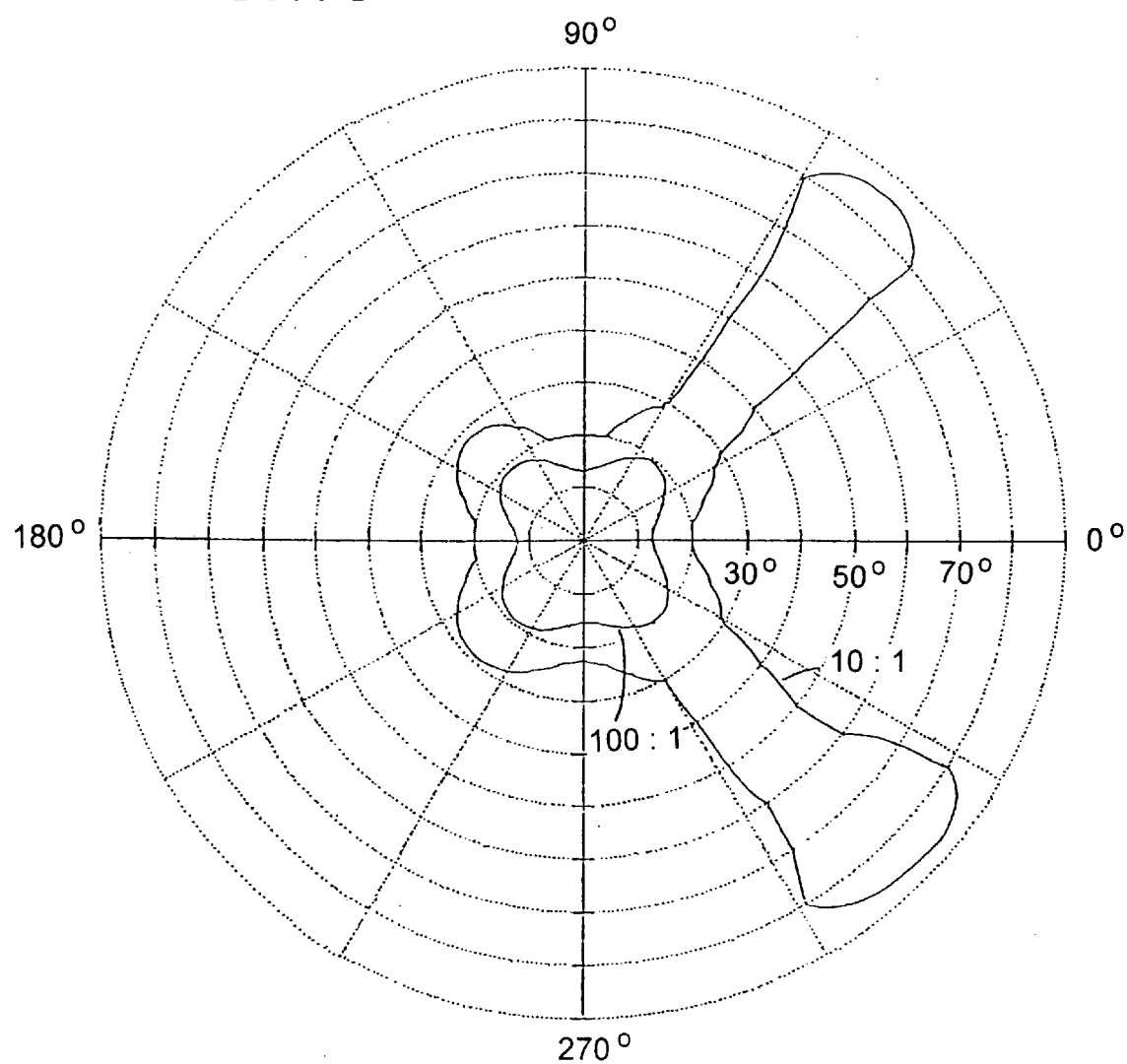
FIG. 16 is a polar plot of contrast ratio of a known type of pi-cell.

FIG. 16 illustrates a different addressing wave form which allows the switching speed from the non-transmissive state to the transmissive state to be improved to approximately two milliseconds.

When the optical state of the device is to be changed, the upper switching voltage is followed by a rest period in which the voltage across the liquid crystal layer 20 is reduced to zero volts. Although any voltage less than the lower operating voltage may be used, it is preferred to use zero volts during this phase so as to obtain the maximum reduction in switching time. Because the twisted director configuration is stabilized in the devices described hereinbefore, there is no danger of an undesirable configuration such as the splay director configuration reappearing and causing undesirable visible phenomena.

Figure 15:
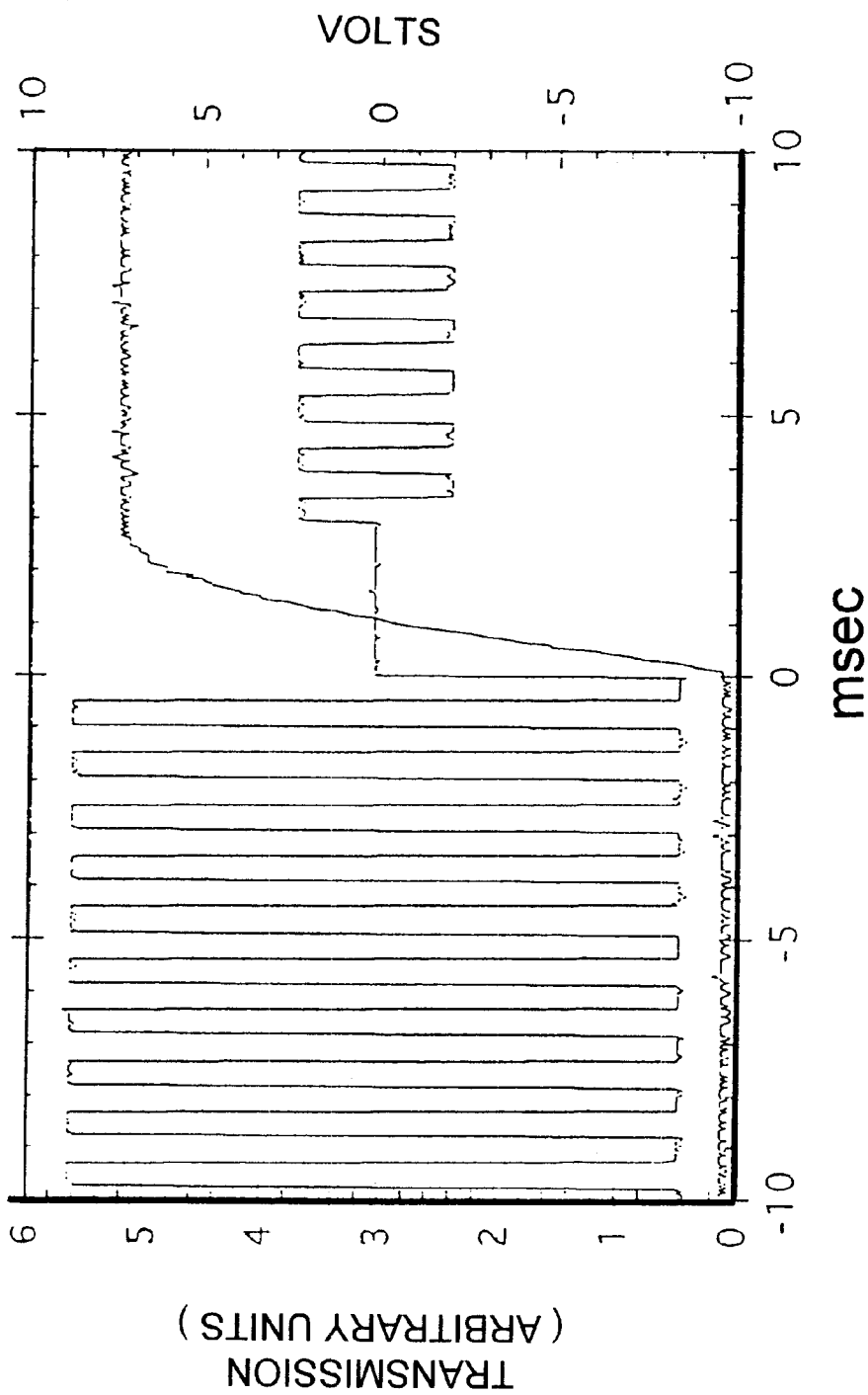
FIG. 15 is graph of voltage against time illustrating a blanking-type switching waveform for switching the second example from a non-transmissive to a transmissive state.

An addressing waveform of the type shown in FIG. 15 may be used in time sequential color systems. It is usual for lap-top computer screens and liquid crystal television screens to be continuously illuminated by a backlight. The use of long blanking periods (periods where the addressing waveform is of zero amplitude) with such continuously lit displays can be undesirable as the optical properties of the blanked state may then become apparent. In particular, for devices where the transmissivity is lower with zero applied volts than when the lower operating voltage is present, the display or pixel may spend sufficient time in the zero applied volt state for the transmissive mode to appear darker than would be the case for an addressing waveform which did not have the zero amplitude portion.

In the case of a time sequential display, addressing may take place during periods when the backlight is switched off. Thus, long blanking times may be used without compromising brightness and without the risk of entering an undesirable configuration such as the splay configuration.

FIG. 16 illustrates the viewing angle performance for the second example of the display of FIG. 2 as described hereinbefore, The isocontrast line for a contrast ratio of 10:1 is laterally asymmetrical and this may be undesirable for many applications of such devices.

Figure 17A:
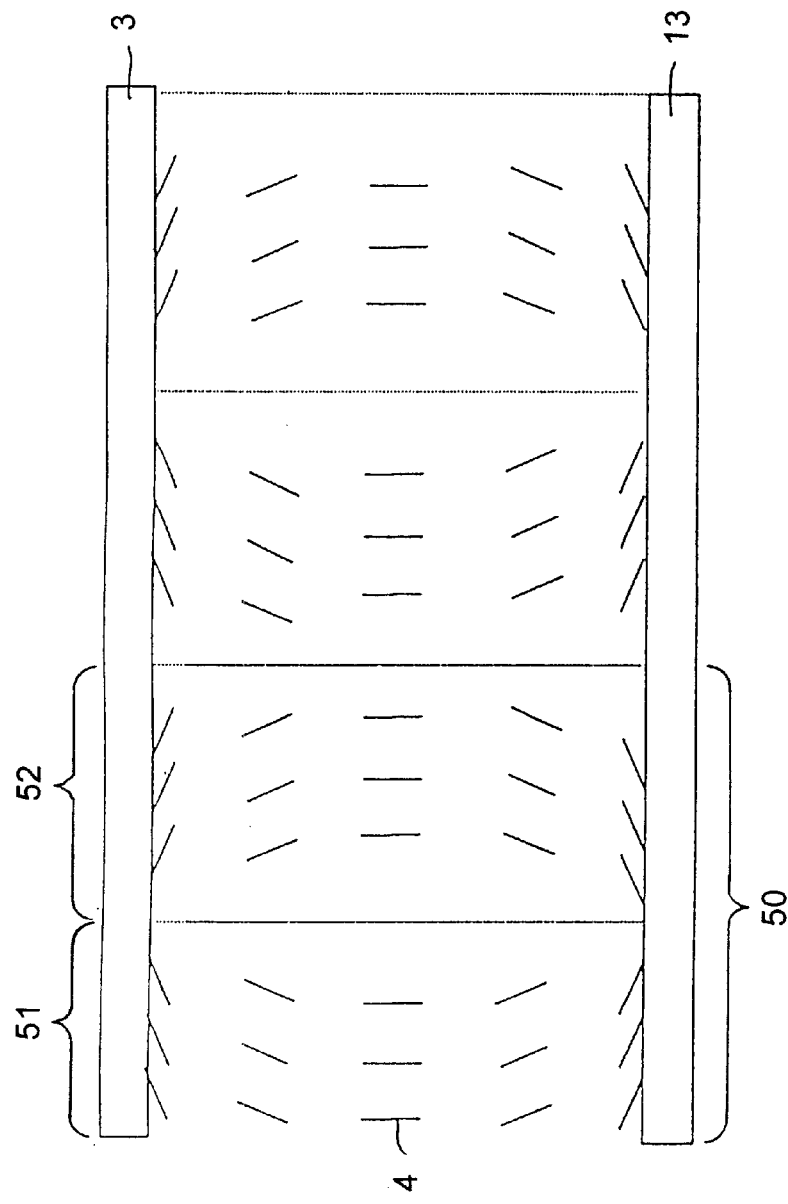
FIG. 17A is a diagrammatic cross-sectional view of a liquid crystal display constituting an embodiment of the invention.
Figure 17B:
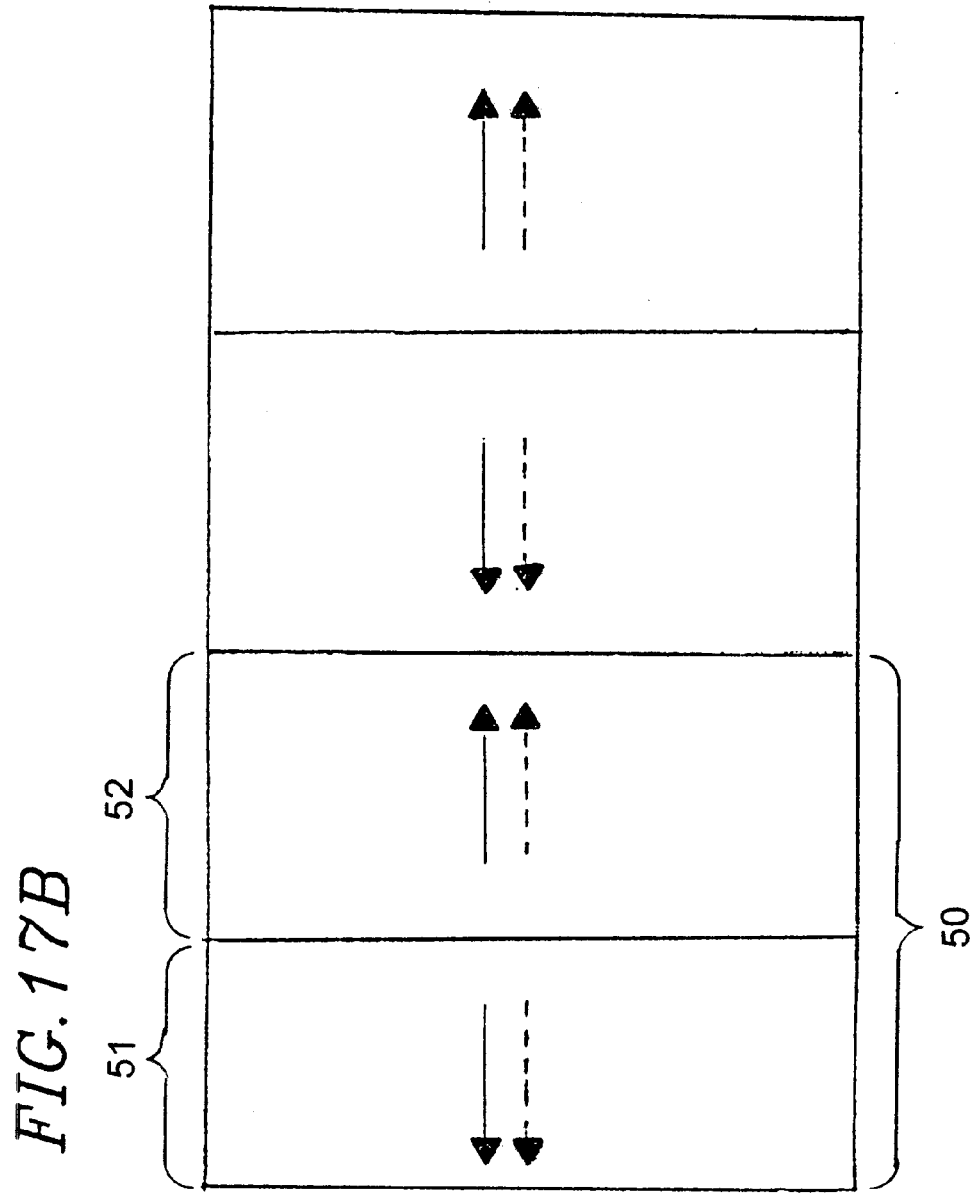
FIG. 17B is a diagrammatic top plan view of the liquid crystal display of FIG. 17A.

FIG. 17A is a diagrammatic cross-sectional view of a liquid crystal display constituting one embodiment of the invention, and FIG. 17B is a diagrammatic top plan view of the liquid crystal display of FIG. 17A. FIGS. 17A and 17B illustrate a device which has a more symmetrical horizontal or lateral viewing angle performance. The device is of the pixelated type and each pixel, such as 50, is divided into two sub-regions or sub-pixels 51 and 62. The alignment direction of the sub-region 51 is opposite that of the sub-region 52. For example, the alignment direction of the sub-region 51 may be disposed at 45° to the absorption axis 17 of the polarizer 15 whereas the alignment direction of the sub-region 52 is disposed at 225° to the absorption axis 17. In this embodiment, the polarizer need not is be patterned, since disposing the absorption axis at 45° to the alignment direction of one sub-region disposes it at 225° to the adjacent sub-region, due to the 180° relative orientation of the alignment directions of the adjacent sub-regions. In an embodiment with more than two sub-regions per region (per pixel), it may be necessary to include a patterned polarizer, since the adjacent sub-regions may be disposed at 90° with respect to each other.

In FIGS. 17A and 17B, the pretilt of the sub-region 51 is opposite to that of the sub-region 52. As shown in FIGS. 17A and 17B, the pretilts of the first alignment layer and the second alignment layer are in opposite directions. In the present specification, it should be understood that when the pretilts of any two alignment layers are referred to as being in opposite directions, or being in the same direction, or being oriented perpendicularly with respect to each other, it is the general direction of the pretilt of each respective alignment layer, not the absolute angle of the pretilt, which is referenced. Thus, for example, the pretilt of the first (upper) alignment layer of the sub-region 51 in FIG. 17A and the pretilt of the second (lower) alignment layer of the sub-region 51 in FIG. 17A are aligned in the same direction, as the pretilt must be in a pi cell. As another example, the pretilt in the first (upper) alignment layer of the sub-region 51, and the pretilt in the first (upper) alignment layer of the adjacent sub-region 52, are in opposite directions. As will be discussed below with respect to FIG. 20, the pretilt of adjacent sub-regions may be disposed perpendicularly or at other angles with respect to each other.

Figure 19:
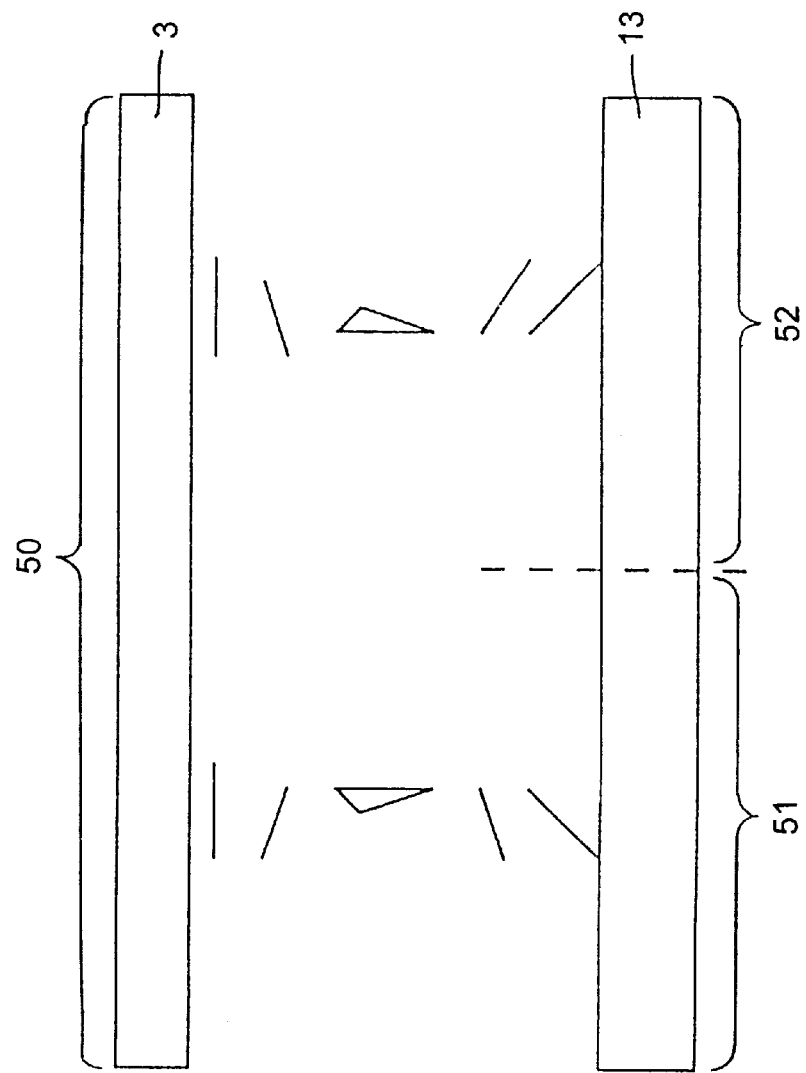
FIG. 19 is a diagrammatic cross-sectional view of a liquid crystal device constituting an embodiment of the invention.
Figure 20A:
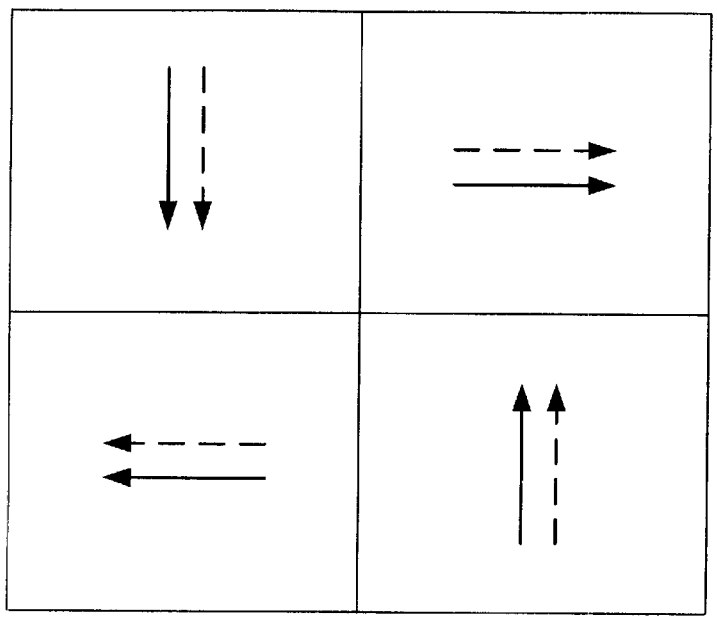
FIGS. 20A–20D are top plan views of exemplary four sub-region surface mode devices in accordance with further embodiments of the invention.
Figure 20B:
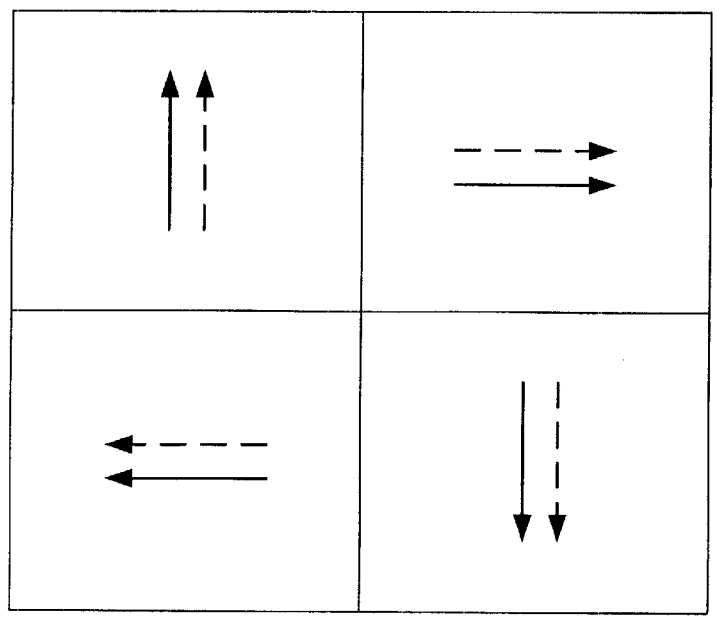
Figure 20C:
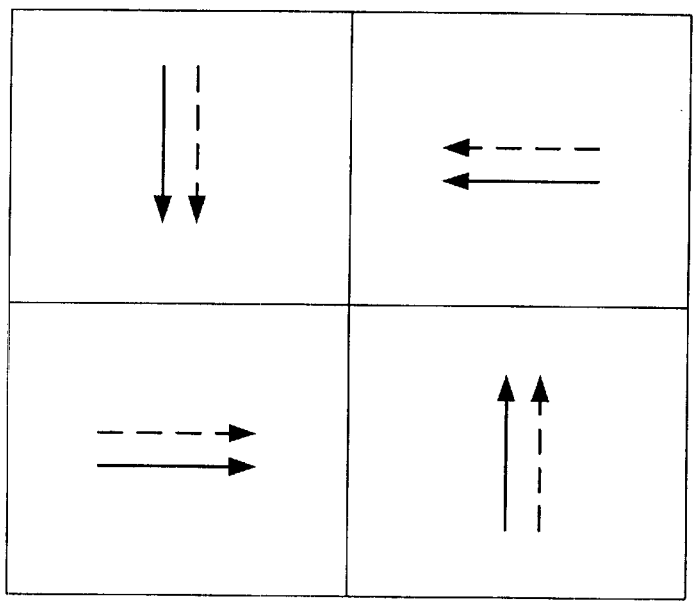
Figure 20D:
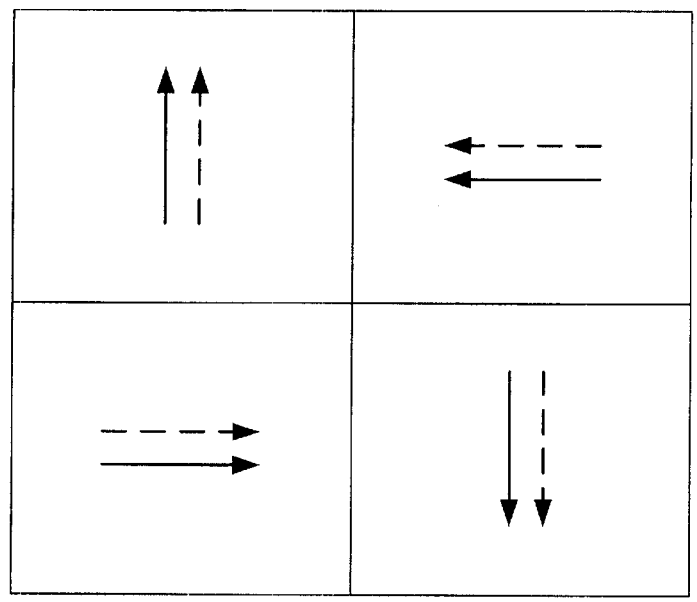

In the present specification, the term "alignment direction" is defined as the direction along which surface liquid crystal molecules lie. When the molecules tilt inward from a surface the alignment direction is the projection onto the surface of the molecular director. Thus, in FIG. 17, the alignment direction of the sub-region 61 is from right-to-left, and the alignment direction of the sub-region 52 is from left-to-right. It is noted that in FIG. 17, the liquid crystal molecules have both an alignment direction and a pretilt. As will be understood by those of skill in the art, in a liquid crystal device, while liquid crystal molecules generally have an alignment direction, the pretilt of such molecules with respect to the alignment layer may be zero or non-zero. FIG. 19 provides an example of a liquid crystal device in which the liquid crystal molecules adjacent one alignment layer 3 have zero pretilt, and the liquid crystal molecules adjacent the other alignment layer 13 have a non-zero pretilt.

Figure 18:
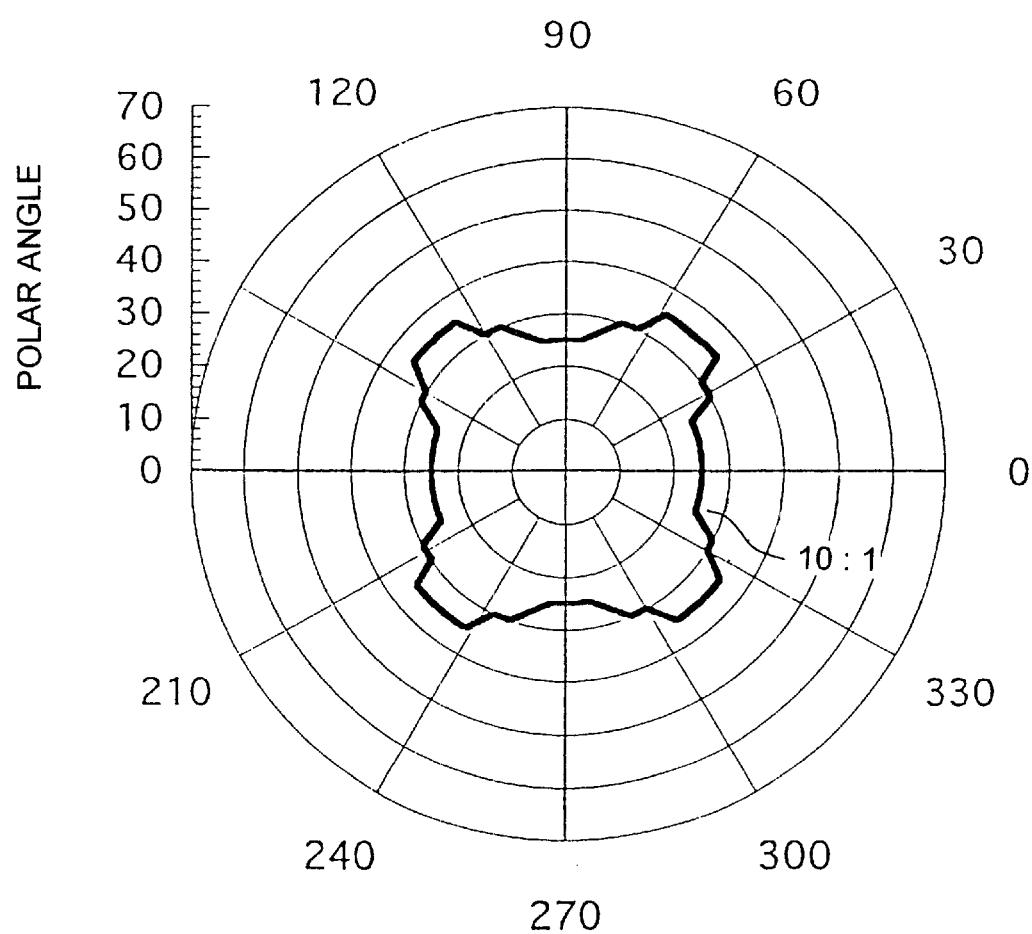
FIG. 18 is a polar plot of contrast ratio of the device of FIGS. 17A and 17B.

FIG. 18 illustrates the viewing angle performance for a device of the type illustrated in FIGS. 17A and 17B. For comparison with FIG. 16, the 10:1 isocontrast line is illustrated. The viewing angle performance is substantially laterally symmetrical.

A device of this type may, for example, have adjacent 100 micrometer width strips of opposite pretilt sign. To provide the appropriately patterned alignment layer, the substrates may be spin-coated with a polymer known as Nissan 610 available from Nissan Chemical Industries Ltd, Tokyo, Japan. The polymer is uniformly rubbed in one direction. A photoresist mask is then formed on the polymer by lithographic techniques so as to leave exposed alternate 100 micrometer wide strips. The exposed strips are then reverse-rubbed.

In a similar fashion to FIG. 17A, FIG. 19 illustrates a side sectional view of a single region or pixel 50 subdivided into two sub-regions or sub-pixels 51, 52. In the case of FIG. 19, however, the liquid crystal surface mode is of the 180° twisted type, rather than the pi-cell type shown in FIG. 17. With a conventional pi-cell, both alignment layers 3, 13 must provide finite (non-zero) pretilts as shown in FIG. 17. Thus, for the pi-cell embodiment of FIG. 17, identical patterning of alignments must be provided on the substrates 3 and 13 and the substrates must then be positionally registered with respect to one another. In the case of the 180° twisted surface mode shown in FIG. 19, however, only one surface (13) need have a non-zero and patterned pretilt. The other surface (3) can have uniformly zero pretilt. This has the advantage that the uniformly zero-pretilt surface need not be as accurately registered with respect to the patterned surface, as in the pi-cell.

It is also possible to form a device which has one liquid crystal surface possessing a certain selected pretilt, and the opposing liquid crystal having a smaller, but non-zero, pretilt. Where both liquid crystal surfaces have a finite pretilt, both can be similarly patterned with a like number of subregions. In such an embodiment, the patterns should be precisely registered as in the foregoing description of the pi-cell of FIG. 17.

As an example of the behavior of surface mode devices found in the prior art FIG. 16 shows the viewing angle characteristics of a 6.2 $\mu$m layer of the liquid crystal material E7 (available from Merck of Darmstadt, Germany). The method of preparing the liquid crystal layer is described above and results in a 2° pretilt at the surfaces and a 180° twist as a result of the addition of a chiral dopant (such as CB15 available from Merck of Darmstadt, Germany). The liquid crystal layer is confined between two crossed polarizers (see 15, 16 of FIG. 2) such that the alignment direction of the liquid crystal is at 45° to the axes of the polarizers. Furthermore a fixed optical retarder (21 of FIG. 2) is included to affect optical characteristics of the device in the manner described by EP 0 616 240 A1. If a voltage is applied to the arrangement a variation of light transmission results. FIG. 16 shows a locus of angular viewing positions of the arrangement giving 10:1 (outer line) and 100:1 (inner line) contrast. In other words the angular positions from which an observer would measure the dark state of the display to be 10 (and 100 respectively) times less transmissive than the bright state. Clearly the angular viewing characteristics of 10:1 contrast are highly asymmetric. This situation is visually disturbing and undesirable.

In one embodiment, the substrates of the surface-mode liquid crystal device are treated so as to provide two distinct pixel-types as shown in FIG. 17. The device is of the pixelated type and each pixel such as 50 is divided into two sub-regions or sub-pixels 51, 52. Alternatively rather than dividing each pixel alternate, whole pixels can have differing alignment. The alignment direction of the sub-pixel 51 is opposite that of the sub-pixel 52. For example the alignment direction of sub-pixel 51 may be disposed at 45° to the absorption axis 17 of the polarizer 15 whereas the alignment direction of the sub-pixel 52 is disposed at 225° to the absorption axis 17. In this embodiment a fixed retarder used in conjunction with the liquid crystal (in the manner described by EP 0 616 240 A1) need itself only be uniform.

A device of this type may for example have adjacent 50 micrometer width stripes of opposite pretilt. To provide the appropriately patterned alignment layer the substrates may be spin-coated with a polymer such as Nissan 610 available from Nissan Chemical Industries Ltd., Tokyo, Japan. The polymer is uniformly rubbed in one direction. A photoresist mask is then formed on the polymer by lithographic techniques so as to leave exposed alternate 50 micrometer wide stripes. The exposed stripes are then reverse rubbed.

FIG. 18 shows the largely symmetric 10:1 contrast viewing angle characteristics of the device sub-pixellated in this manner.

In one embodiment, the chirally doped 180° twisted surface mode device does not include a pretilt in both surfaces of the device. As shown in FIG. 19 therefore, only one surface (13) needs to be treated (such as, e.g., by the lithographic method described in connection with the above-described embodiment to produce multiple alignment directions. The other surface (3) can have a uniform pretilt of 0° and can be prepared, for example, by spin coating a layer of photosensitive material and exposing the surface to polarized UV light in the manner described in GB 2 318 880 A. Use of only one pretilted surface has the advantage of not requiring the uniform 0° pretilt surface to be mechanically rubbed. In addition to the additional production steps required, mechanical rubbing of displays produces dust which can lead to uneven spacing of the two substrates and is therefore undesirable.

In one embodiment, the substrates of the display can be treated to result in more than two alignment directions. For example FIGS. 20A–20D shows a top-plan view of one arrangement of a single pixel or region of a display subdivided into four sub-pixels or sub-regions. The unbroken arrows show the rubbing direction on the upper plate with the pretilt in the direction of the arrow head. Similarly the broken arrows apply to the lower substrate. As shown in FIGS. 20A–20D, the four sub-regions include first and second pairs of sub-regions, in which the sub-regions in the first pair have alignment directions which are perpendicular to the second sub-region alignment directions. As shown in FIGS. 20A–20D, the pretilt of the sub-regions in each pair are opposite each other, while the alignment direction of the first pair of sub-regions is perpendicular to the alignment direction of the second pair of sub-regions.

FIGS. 20A–20D show four possible arrangements os single pixels or regions, in which the pretilt for embodiments including four sub-regions are patterned in several possible arrangements. In the embodiments shown in FIGS. 20A–20D, the four sub-regions may be considered as arranged in pairs and the alignment directions of respective pairs of sub-regions are perpendicular to each other. The sub-regions may be spatially re-ordered within the pixel or region, four possible arrangements of which are shown in FIGS. 20A–20D. Furthermore, the four sub-regions may be of different sizes, i.e., may occupy different percentages of the total area of the pixel or region.

Consideration of FIGS. 20A–20D will reveal that further arrangements of the alignment directions and pretilts of the sub-regions may be made. For example, if the alignment directions of the lower left and upper right quadrants are rotated by 90° in a counterclockwise direction, the four sub-region device is reduced to a two-subregion device, since the alignment directions and pretilts of the upper and lower left quadrants, and of the upper and lower right quadrants, respectively, will be the same. Similarly, if the upper and lower alignment layers are positionally reversed, then four further arrangements (not shown) similar to those of FIGS. 20A–20D will be obtained.

Furthermore, in other embodiments, the pixels or regions may be subdivided into sub-regions of greater number, such as nine or sixteen sub-regions, within the scope of the present invention.

It will be clear from the previous discussion that in some embodiments the plurality of sub-regions may have their liquid crystal alignment directions lying at angles other than multiples of 90° with respect to one another. It also will be clear that in such cases where sub-regions have their liquid crystal alignment directions not lying at multiples of 90°, the requirement for the polarizer axes to lie at 45° to the alignment direction of the liquid crystal will result in the requirement for patterned polarizers with a laterally varying direction of the polarization axes. A method of making such a patterned polarizer is given in European Patent Application No. 0 444 703 A2. Thus, in such an embodiment, the first alignment direction and the second alignment direction lie at a non-integral multiple of 90° with respect to each other.

Furthermore, in other embodiments, the second alignment layer may be subdivided into a plurality of sub-regions, in which the alignment directions are parallel to the first alignment layer, but in which the pretilt of the second alignment layer is zero or substantially zero.

A method of obtaining such multiple alignment directions is by rubbing a polymer through a series of lithographic masks as described above. Alternatively so-called light photo-polymerizable polymers can be used. These are materials such as coumarine molecules which crosslink forming bonds in a direction defined by the incoming electric field vector of the light. Such materials may be spin or dip coated onto the glass or plastic substrates and an alignment direction and pretilt subsequently produced through exposure to UV light. Such a process is described by M. Schadt et. al., Japan.J.Appl.Phys. 31, 1992, pp. 2155–2164. An example of an alternative photoalignment process, involving the cleavage of bonds of polyimide polymer chains and used to make a two-domain 90° twisted nematic device, is described by K. W. Lee et. al., SID 96 Digest, pp. 638–641.

Figure 21:
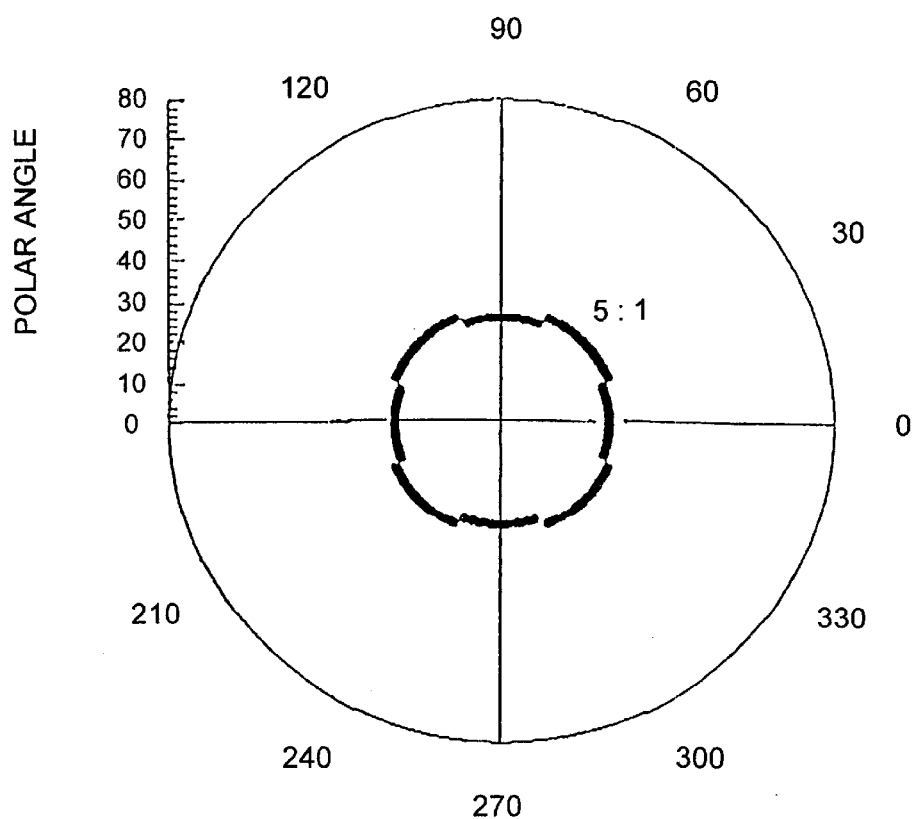
FIG. 21 shows a line of 5:1 contrast for a four sub-region device.

FIG. 21 shows modeled data of the locus of 6:1 contrast ratio angular viewing positions for a 4-domain, 10 $\mu$m pi-cell, of a liquid crystal material for which the birefringence is 0.143 and the dielectric anisotropy is 4.6. The improved symmetry of the viewing characteristics (compared for example with the single domain device of FIG. 16) is apparent. An issue which must be considered when creating multi-domain surface mode devices is the requirement for a fixed optical retarder (21 of FIG. 2), with its optic axis crossed with respect to the local alignment direction of the liquid crystal. Clearly therefore it may be necessary for this fixed optical retarder to itself possess a laterally varying direction of the optic axis. Such patterned retarders can be made, for example, by the photolithograpic methods by M. Schadt, Japan. J. Appl. Phys., Vol. 34 (1995) pp. L 764–767.

Figure 22:
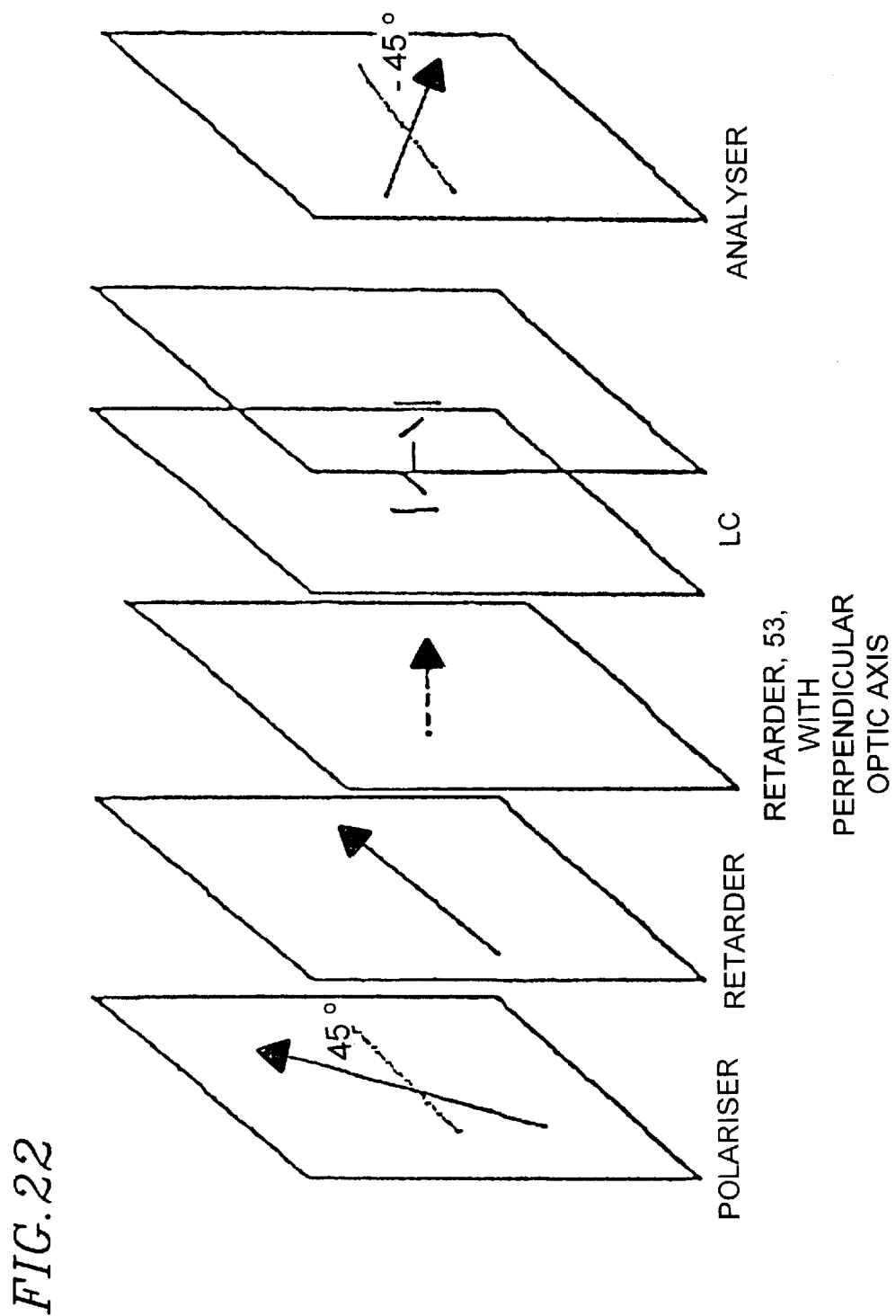
FIG. 22 shows use of a retarder film with optic axis perpendicular to plane of film.

In a further embodiment of this invention we consider the use of additional optical films to further improve the angular viewing characteristics of the multi-domain surface mode devices. FIG. 22 (cf. FIG. 2) shows an example using a fixed film (53) with its optic axis perpendicular to the plane containing the liquid crystal layer, and possessing a negative optical birefringence (i.e., ordinary refractive index>extraordinary index). The action of such films in enhancing viewing angle is well understood in the literature. Briefly, the liquid crystal molecules in a pi-cell or the 180° twisted surface mode device we have described are largely aligned along the direction of the applied electric field (i.e., perpendicular to the plane of the liquid crystal layer) during device operation, and thus point in the same direction as the optic axis of the retarder 53. However, the liquid crystal molecules have positive birefringence (i.e., ordinary refractive index<extraordinary index) and so their optical properties vary in an opposite sense to those of the retarder 53. Thus the liquid crystal layer and the retarder 53 tend to compensate for each others angular viewing dependence. An advantage of using a film for the retarder 53, with optic axis perpendicular to the plane of the liquid crystal layer is that it need not be patterned when considering a liquid crystal with multi-domain alignment, since the film's axis points perpendicular to the film regardless of the local alignment direction of the liquid crystal.

Figure 23:
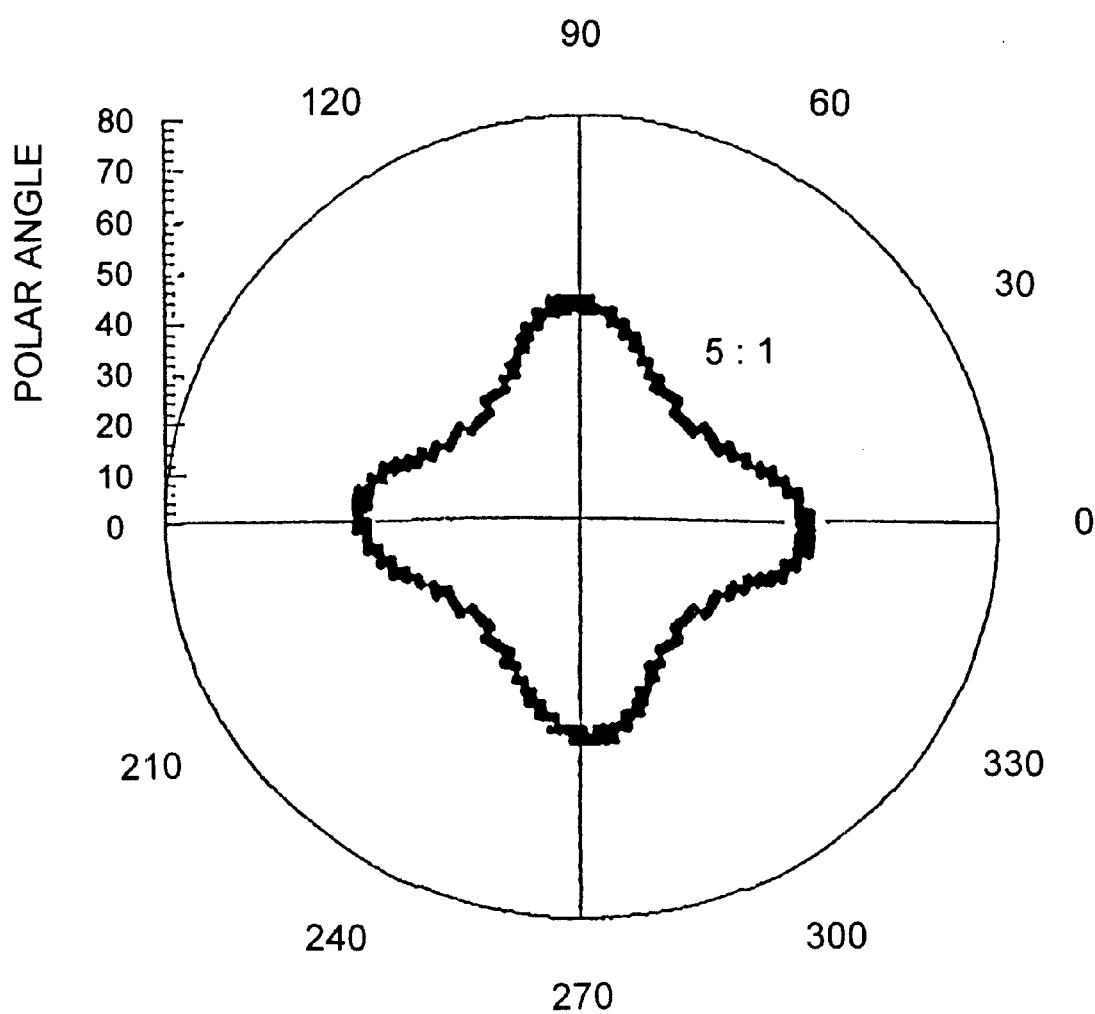
FIG. 23 shows a line of 5:1 contrast for a four-sub-region device combined with a retarder film with optic axis perpendicular to plane of film.

FIG. 23 shows the 5:1 contrast ratio positions of the same device as for FIG. 21 except that in FIG. 23 a 90 μm fixed retarder with perpendicular optic axis and optical refractive index anisotropy −0.005 is included with the liquid crystal device in the manner indicated by FIG. 22.

The use of other types of viewing angle compensation films, such as biaxial films as described in connection with single domain pi-cells by T. Miyashita et. al., SID 95 Digest, pp. 797–800, will be known to those skilled in the art. Such films nay need to have a laterally varying optic axis direction, as will now be obvious from the previous discussion here.

In this embodiment of the surface mode liquid crystal device, the second alignment layer for aligning the adjacent liquid crystal in a second alignment direction includes four sub-regions, thereby being equal to the number of subregions in the first alignment layer, i.e., four. In this embodiment, each sub-region in the first alignment layer is disposed opposite a sub-region in the second alignment layer.

Figure 24:
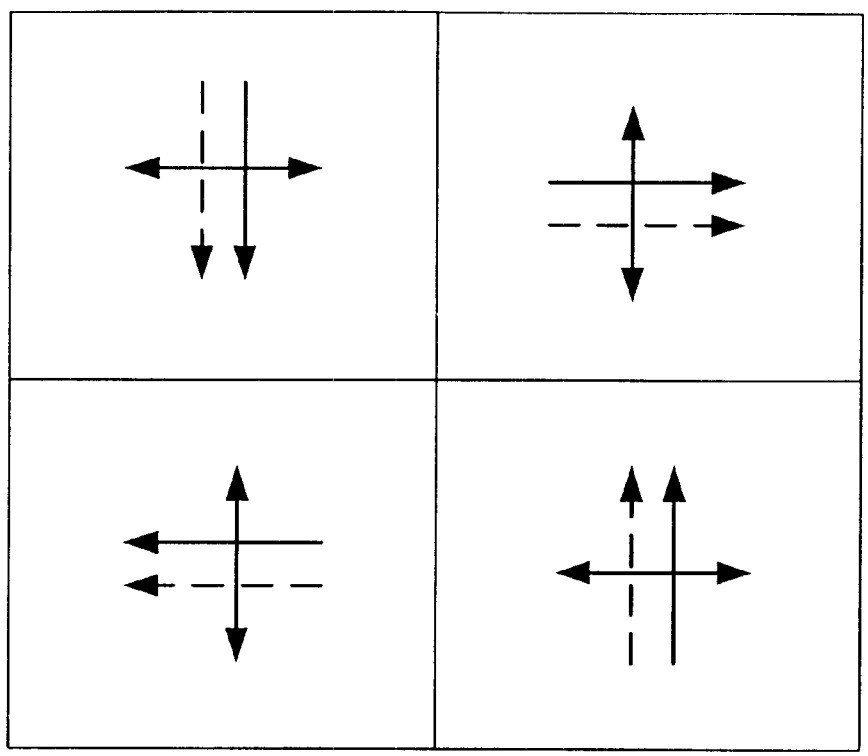
FIG. 24 is a is a top plan view of a four sub-region device together with a patterned retarder in accordance with another embodiment of the invention.

FIG. 24 is a top plan view of a four sub-region device together with a patterned retarder in accordance with another embodiment of the invention. In this embodiment, the retarder used for reducing the retardation of the liquid crystal layer comprises a plurality of regions with optic axis in each region aligned perpendicular to the alignment direction of the adjacent liquid crystal region. As shown in FIG. 24, the solid arrow with a solid head shows the liquid crystal alignment of the upper alignment layer, the dashed-line arrow with a solid head shows the liquid crystal alignment of the lower alignment layer, and the open double-headed arrow shows the optic axis of a multi-sub-region retarder.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

We claim:

1. A surface mode liquid crystal device, comprising a liquid crystal layer disposed between first and second alignment layers for substantially parallel-aligning the liquid crystal layer, the first alignment layer comprising a plurality of regions defining respective picture elements, each of the regions comprising a plurality of sub-regions, the plurality of sub-regions each comprising at least one first sub-region for aligning the adjacent liquid crystal in a first alignment direction and at least one second sub-region for aligning the adjacent liquid crystal in a second alignment direction substantially different from that of the first alignment direction, and liquid crystal directors in the middle portion of the liquid crystal layer being oriented in a surface mode configuration.

2. A device as claimed in claim 1, wherein the second alignment direction is substantially opposite to the first alignment direction.

3. A device as claimed in claim 1, wherein each region comprises one first sub-region and one second sub-region.

4. A device as in claim 1, wherein in the first alignment layer, the plurality of sub-regions comprises at least two sub-regions, the sub-regions having alignment directions arranged in multiples of 90° with respect to each other.

5. A device as claimed in claim 4, wherein each plurality of sub-regions comprises four sub-regions.

6. A device as in claim 5, wherein in both the first and second alignment layers, the plurality of sub-regions comprises at least a first pair and a second pair of sub-regions, the sub-regions in each pair having alignment directions arranged in multiples of 90° with respect to the alignment directions of adjacent sub-regions.

7. A device as claimed in claim 4, wherein the plurality of sub-regions comprises more than four sub-regions.

8. A device as claimed in claim 1, wherein the first alignment layer is arranged to provide a non-zero pretilt.

9. A device as claimed in claim 8, wherein the second alignment layer is arranged to align the adjacent liquid crystal with a substantially zero pretilt and the liquid crystal layer is sufficiently chiral to stabilize a substantially 180° twisted liquid crystal director configuration in the absence of an applied field across the liquid crystal layer.

10. A device as claimed in claim 9, wherein d/p is greater than or equal to substantially 0.25, where d is the thickness of the liquid crystal layer and p is the pitch which the chiral liquid crystal would have in an unconstrained infinitely thick layer.

11. A device as claimed in claim 10, wherein d/p is less than 0.75.

12. A device as claimed in claim 11, wherein d/p is substantially equal to 0.25.

13. A device as claimed in claim 10, wherein the liquid crystal layer has a positive dielectric anisotropy.

14. A device as claimed in claim 13, wherein the first alignment layer is arranged to provide a pretilt of between 1° and 10°.

15. A device as claimed in claim 14, wherein the pretilt is between 1° and 5°.

16. A device as claimed in claim 1, wherein both the first and the second alignment layers are arranged to provide a non-zero pretilt.

17. A device as claimed in claim 1, wherein the liquid crystal layer comprises a nematic liquid crystal and a chiral dopant.

18. A device as claimed in claim 1, wherein d/p is greater than or equal to substantially 0.25, where d is the thickness of the liquid crystal layer and p is the pitch which the chiral liquid crystal would have in an unconstrained infinitely thick layer.

19. A device as claimed in claim 18, wherein d/p is less than 0.75.

20. A device as claimed in claim 19, wherein d/p is substantially equal to 0.25.

21. A device as claimed in claim 1, wherein the liquid crystal layer has a positive dielectric anisotropy.

22. A device as claimed in claim 21, wherein the first and second alignment layers are arranged to provide a pretilt of between 1° and 10°.

23. A device as claimed in claim 22, wherein the pretilt is between 1° and 5°.

24. A device as claimed in claim 21, wherein the first alignment layer is arranged to provide a pretilt of between 1° and 10°.

25. A device as claimed in claim 24, wherein the pretilt is between 1° and 5°.

26. A device as claimed in claim 1, comprising an active matrix addressing arrangement.

27. A device as claimed in claim 1, wherein the liquid crystal layer is disposed between first and second polarizers whose polarizing directions are orthogonal and one of whose polarizing direction is aligned substantially at 45° to the alignment direction or the first alignment direction of the first alignment layer.

28. A device as claimed in claim 27, wherein the polarizers are patterned into a plurality of sub-regions with a laterally varying direction of the polarizing axes such that the polarizing axes of each polarizer sub-region lie at 45° to the alignment direction of the liquid crystal sub-region immediately adjacent to the polarizer.

29. A device as claimed in claim 1, wherein the liquid crystal layer is disposed between first and second polarizers whose polarizing directions are substantially parallel and aligned substantially at 45° to the alignment direction of the first alignment direction of the first alignment layer.

30. A device as claimed in claim 29, wherein the polarizers are patterned into a plurality of sub-regions with a laterally varying direction of the polarizing axes such that the polarizing axes of each polarizer sub-region lie at 45° to the alignment direction of the liquid crystal sub-region immediately adjacent to the polarizer.

31. A device as claimed in claim 1, wherein the liquid crystal layer is disposed between a polarizer and a reflector.

32. A device as claimed in claim 31, wherein the polarizer is patterned into a plurality of sub-regions with a laterally varying direction of the polarizing axes such that the polarizing axes of each polarizer sub-region lie at 45° to the alignment direction of the liquid crystal sub-region immediately adjacent to the polarizer.

33. A device as claimed in claim 1, comprising a first fixed retarder for reducing the retardation of the liquid crystal layer.

34. A device as claimed in claim 33, wherein the first fixed retarder is of positive birefringence and has an optic axis substantially perpendicular to the alignment direction of the first alignment direction of the first alignment layer.

35. A device as claimed in claim 33, wherein the first fixed retarder is of negative birefringence and has an optic axis substantially parallel to the alignment direction of the first alignment direction of the first alignment layer.

36. A device as claimed in claim 33, wherein the retarder used for reducing the retardation of the liquid crystal layer comprises a plurality of regions with optic axis in each region aligned perpendicular to the alignment direction of the adjacent liquid crystal region.

37. A device as claimed in claim 1, comprising a second fixed retarder of negative birefringence having an optic axis substantially perpendicular to the liquid crystal layer.

38. A device as claimed in claim 1, wherein the first alignment direction and the second alignment direction lie at a non-integral multiple of 90° with respect to each other.

* * * * *